US012651954B2

(12) United States Patent
Pan et al.

(10) Patent No.: US 12,651,954 B2
(45) Date of Patent: Jun. 9, 2026

(54) POWER SUPPLY APPARATUS, THREE-PHASE TRANSFORMER CIRCUIT, AND CHARGING PILE

(71) Applicant: Huawei Digital Power Technologies Co., Ltd., Shenzhen (CN)

(72) Inventors: Denghai Pan, Shenzhen (CN); Yuping Qiu, Dongguan (CN); Jiansheng Chen, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 303 days.

(21) Appl. No.: 18/519,429

(22) Filed: Nov. 27, 2023

(65) Prior Publication Data

US 2024/0186908 A1 Jun. 6, 2024

(30) Foreign Application Priority Data

Dec. 5, 2022 (CN) .......................... 202211550352.5

(51) Int. Cl.
*H02M 1/00* (2007.01)
*H02M 3/00* (2006.01)
*H02M 3/28* (2006.01)
*H02M 3/335* (2006.01)

(52) U.S. Cl.
CPC ........... *H02M 1/0064* (2021.05); *H02M 3/01* (2021.05); *H02M 3/33573* (2021.05); *H02M 1/0077* (2021.05); *H02M 3/285* (2013.01)

(58) Field of Classification Search
CPC .... H02M 1/0064; H02M 1/0077; H02M 3/01; H02M 3/285; H02M 3/33569–3/33576; H02M 7/08
See application file for complete search history.

(56) References Cited

U.S. PATENT DOCUMENTS

| | | | | |
|---|---|---|---|---|
| 11,664,717 B2 * | 5/2023 | Morrison | ............ | H02M 1/0058 |
| | | | | 363/68 |
| 2010/0277960 A1 | 11/2010 | Cottingham et al. | | |
| 2012/0229088 A1 * | 9/2012 | Moon | ....................... | H02J 7/02 |
| | | | | 320/109 |

(Continued)

FOREIGN PATENT DOCUMENTS

| | | | |
|---|---|---|---|
| CN | 2443472 Y | 8/2001 | |
| CN | 110635692 A | 12/2019 | |

(Continued)

*Primary Examiner* — Fred E Finch, III
(74) *Attorney, Agent, or Firm* — Maier & Maier, PLLC

(57) ABSTRACT

A power supply apparatus, a three-phase transformer circuit, and a charging pile. The power supply apparatus includes a turns ratio switching circuit, a connection relationship switching circuit, a three-phase transformer, and two three-phase rectifier bridge circuits. A three-phase primary winding of the three-phase transformer is configured to receive a three-phase alternating current. A three-phase secondary winding of the three-phase transformer is configured to output a three-phase alternating current to each of the two three-phase rectifier bridge circuits. A running mode of the three-phase transformer includes a first turns ratio mode and a second turns ratio mode. The turns ratio switching circuit is configured to switch a quantity of turns of the three-phase primary winding, to switch the running mode of the three-phase transformer.

14 Claims, 7 Drawing Sheets

(56)  References Cited

U.S. PATENT DOCUMENTS

| 2014/0340950 | A1* | 11/2014 | Ganev | H02M 7/10 |
| | | | | 363/67 |
| 2020/0295667 | A1* | 9/2020 | Takegami | H02M 3/33507 |
| 2022/0294340 | A1* | 9/2022 | Liu | H02M 1/0077 |
| 2023/0378795 | A1* | 11/2023 | Ammanamanchi | |
| | | | | H02M 1/0077 |
| 2024/0079952 | A1* | 3/2024 | Chen | H02M 3/285 |
| 2024/0278659 | A1* | 8/2024 | Elezab | B60L 53/62 |
| 2025/0337320 | A1* | 10/2025 | Pan | H02M 1/008 |

FOREIGN PATENT DOCUMENTS

| CN | 112234567 | A | 1/2021 |
| CN | 113890367 | A | 1/2022 |
| CN | 114301274 | A | 4/2022 |
| CN | 114448273 | A | 5/2022 |

* cited by examiner

1

POWER SUPPLY APPARATUS, THREE-PHASE TRANSFORMER CIRCUIT, AND CHARGING PILE

CROSS-REFERENCE TO RELATED APPLICATIONS

This application claims priority to Chinese Patent Application No. 202211550352.5, filed on Dec. 5, 2022, which is hereby incorporated by reference in its entirety.

TECHNICAL FIELD

The embodiments relate to the field of power electronics technologies and to a power supply apparatus, a three-phase transformer circuit, and a charging pile.

BACKGROUND

At present, there are many types of electric vehicles on the market. To meet the existing and future evolution requirements, a charging pile needs to implement a wide range of output voltages. An output voltage range of an existing charging pile is adjusted mainly by adjusting a switching frequency of an inverter circuit. However, the switching frequency of the inverter circuit affects conversion efficiency of the charging pile. In addition, the output voltage range of the charging pile is small due to a limited adjustment range of the switching frequency of the inverter circuit. Therefore, it is difficult for the existing charging pile to adapt to charging voltage requirements of various types of electric vehicles. This reduces practicality of the charging pile.

How to enable the charging pile to improve conversion efficiency in a wide range of output voltages and implement a wide range of efficient output becomes an urgent problem to be resolved.

SUMMARY

In view of this, embodiments provide a power supply apparatus, a three-phase transformer circuit, and a charging pile to improve conversion efficiency in a wide range of output voltages and implement a wide range of efficient output.

According to a first aspect, the embodiment provide a power supply apparatus. The power supply apparatus includes a turns ratio switching circuit, a connection relationship switching circuit, a three-phase transformer, and two three-phase rectifier bridge circuits. A three-phase primary winding of the three-phase transformer is configured to receive a three-phase alternating current. A three-phase secondary winding of the three-phase transformer is configured to output a three-phase alternating current to each of the two three-phase rectifier bridge circuits. A running mode of the three-phase transformer includes a first turns ratio mode and a second turns ratio mode. The turns ratio switching circuit is configured to switch a quantity of turns of the three-phase primary winding, to switch the running mode of the three-phase transformer. A quantity of turns of a primary winding of each phase includes a first quantity of turns and a second quantity of turns. The second quantity of turns is greater than the first quantity of turns. The first quantity of turns corresponds to the first turns ratio mode. The second quantity of turns corresponds to the second turns ratio mode. The connection relationship switching circuit is configured to switch a connection relationship between the two three-phase rectifier bridge circuits. The two three-phase rectifier bridge circuits are connected in series or in parallel through the connection relationship switching circuit.

It may be understood that an output voltage of the power supply apparatus can be adjusted by changing the running mode of the three-phase transformer and a connection manner of the two three-phase rectifier bridge circuits.

With reference to the first aspect, in a possible implementation, the turns ratio switching circuit or the connection relationship switching circuit is configured to adjust an output voltage range of the power supply apparatus. In response to switching the running mode of the three-phase transformer by the turns ratio switching circuit and switching the connection relationship between the two three-phase rectifier bridge circuits by the connection relationship switching circuit, the output voltage of the power supply apparatus falls within at least one of a first voltage range, a second voltage range, a third voltage range, or a fourth voltage range. An upper limit of the first voltage range is less than or equal to a lower limit of the second voltage range. An upper limit of the third voltage range is less than or equal to a lower limit of the fourth voltage range.

In this implementation, the two running modes of the three-phase transformer are combined with the two connection manners of the three-phase rectifier bridge circuits, so that the output voltage of the power supply apparatus can fall within four different voltage ranges. The power supply apparatus divides a wide range of output voltages into a plurality of voltage ranges. In each working mode, a switching frequency of a three-phase inverter bridge circuit needs to be adjusted only in one of the voltage ranges. In this way, a range in which the power supply apparatus needs to adjust the switching frequency is small, so that the power supply apparatus can keep working efficiently.

With reference to the first aspect, in a possible implementation, the primary winding of each phase of the three-phase transformer includes a first primary winding and a second primary winding. One end of each of the three first primary windings is configured to receive a three-phase alternating current through a three-phase resonant circuit. The other ends of the three second primary windings are connected. In a primary winding of one phase, the other end of the first primary winding is connected to one end of the second primary winding to form a tap. The turns ratio switching circuit includes two turns ratio switching switches. The two turns ratio switching switches each are configured to connect the other end of the first primary winding to one end of the second primary winding in each of primary windings of the other two phases, or connect the other end of each of the two first primary windings in primary windings of the other two phases to the tap.

With reference to the first aspect, in a possible implementation, the primary winding of each phase of the three-phase transformer includes a first primary winding and a second primary winding. One end of each of the three first primary windings is configured to receive a three-phase alternating current through a three-phase resonant circuit. In the primary winding of each phase, the other end of the first primary winding is connected to one end of the second primary winding to form a tap. The turns ratio switching circuit includes three turns ratio switching switches. The three turns ratio switching switches are configured to sequentially connect the three first primary windings in the three-phase primary winding through the three taps, or sequentially connect the primary windings of three phases through the other ends of the three second primary windings.

In this implementation, the three-phase transformer can run in the first turns ratio mode or the second turns ratio mode by disposing the turns ratio switching switches. The output voltage range of the power supply apparatus can be adjusted by changing the running mode of the three-phase transformer, to implement a wide range of output voltages.

With reference to the first aspect, in a possible implementation, a secondary winding of each phase of the three-phase transformer includes a first secondary winding and a second secondary winding. One end of each of the three first secondary windings in the three-phase transformer is connected to one of three bridge arm midpoints of one of the three-phase rectifier bridge circuits, and the other ends of the three first secondary windings are connected. One end of each of the three second secondary windings in the three-phase transformer is connected to one of three bridge arm midpoints of the other three-phase rectifier bridge circuit, and the other ends of the three second secondary windings are connected.

With reference to the first aspect, in a possible implementation, a secondary winding of each phase of the three-phase transformer includes a first secondary winding and a second secondary winding. The three first secondary windings are sequentially connected. One end of each of the three first secondary windings is configured to be connected to one of three bridge arm midpoints of one of the three-phase rectifier bridge circuits. The three second secondary windings are sequentially connected. One end of each of the three second secondary windings is configured to be connected to one of three bridge arm midpoints of the other three-phase rectifier bridge circuit.

With reference to the first aspect, in a possible implementation, the connection relationship switching circuit includes a series switch and two parallel switches. The series switch is configured to connect the two three-phase rectifier bridge circuits in series. Two ends of the series switch are respectively connected to a positive electrode of one of the three-phase rectifier bridge circuits and a negative electrode of the other three-phase rectifier bridge circuit. The two parallel switches are configured to connect the two three-phase rectifier bridge circuits in parallel. Two ends of one of the parallel switches are respectively connected to negative electrodes of the two three-phase rectifier bridge circuits. Two ends of the other parallel switch are respectively connected to positive electrodes of the two three-phase rectifier bridge circuits.

In this implementation, the series switch and the two parallel switches are disposed between the two three-phase rectifier bridge circuits, so that the two three-phase rectifier bridge circuits can switch between a series mode and a parallel mode. The output voltage range of the power supply apparatus can be adjusted by changing a connection between the two three-phase rectifier bridge circuits to a series connection or a parallel connection, to implement a wide range of output voltages.

With reference to the first aspect, in a possible implementation, the turns ratio switching circuit is configured to: in response to connecting the two three-phase rectifier bridge circuits in parallel by the connection relationship switching circuit, switch the running mode of the three-phase transformer, so that the power supply apparatus outputs a voltage within the first voltage range or the second voltage range. The turns ratio switching circuit is further configured to: in response to connecting the two three-phase rectifier bridge circuits in series by the connection relationship switching circuit, switch the running mode of the three-phase transformer, so that the power supply apparatus outputs a voltage within the third voltage range or the fourth voltage range.

In this implementation, the connection manner of the two three-phase rectifier bridge circuits is determined through the connection relationship switching circuit, and then the running mode of the three-phase transformer is changed, so that the output voltage of the power supply apparatus can fall within different ranges.

With reference to the first aspect, in a possible implementation, the turns ratio switching circuit is configured to switch the running mode of the three-phase transformer in response to a result of comparing a series voltage or a parallel voltage of the two three-phase rectifier bridge circuits with at least one preset voltage. The at least one preset voltage includes an upper limit or a lower limit of at least one of the first voltage range, the second voltage range, the third voltage range, or the fourth voltage range.

In this implementation, a voltage range within which a power supply voltage required by a load falls can be obtained through a result of comparing the preset voltage with upper limits or lower limits of different voltage ranges. The running mode of the three-phase transformer is adjusted based on the voltage range within which the power supply voltage required by the load falls, to meet a voltage requirement of the load.

With reference to the first aspect, in a possible implementation, the connection relationship switching circuit is configured to: in response to running in the first turns ratio mode by the three-phase transformer, switch the connection relationship between the two three-phase rectifier bridge circuits, so that the power supply apparatus outputs a voltage within the second voltage range or the fourth voltage range. The connection relationship switching circuit is configured to: in response to running in the second turns ratio mode by the three-phase transformer, switch the connection relationship between the two three-phase rectifier bridge circuits, so that the power supply apparatus outputs a voltage within the first voltage range or the third voltage range.

In this implementation, the running mode of the three-phase transformer is determined, and then the connection manner of the two three-phase rectifier bridge circuits is changed, so that the output voltage of the power supply apparatus can fall within different ranges.

With reference to the first aspect, in a possible implementation, the connection relationship switching circuit is configured to switch the connection relationship between the two three-phase rectifier bridge circuits in response to a result of comparing a series voltage or a parallel voltage of the two three-phase rectifier bridge circuits with at least one preset voltage. The at least one preset voltage includes an upper limit or a lower limit of at least one of the first voltage range, the second voltage range, the third voltage range, or the fourth voltage range.

In this implementation, a voltage range within which a power supply voltage required by a load falls can be obtained through a result of comparing the preset voltage with upper limits or lower limits of different voltage ranges. The connection manner of the two three-phase rectifier bridge circuits is adjusted based on the voltage range within which the power supply voltage required by the load falls, to meet a voltage requirement of the load.

With reference to the first aspect, in a possible implementation, the power supply apparatus includes a three-phase inverter bridge circuit. Three bridge arm midpoints of the three-phase inverter bridge circuit output a three-phase alternating current to three primary windings of the three-phase transformer through a three-phase resonant circuit. The three-phase inverter bridge circuit is configured to run in a first switching frequency range in response to that a parallel voltage of the two three-phase rectifier bridge circuits falls within the second voltage range, that a series voltage of the two three-phase rectifier bridge circuits falls within the third voltage range or the fourth voltage range, that the connection relationship switching circuit connects the two three-phase rectifier bridge circuits in series, or that the connection relationship switching circuit connects the two three-phase rectifier bridge circuits in parallel and the three-phase transformer runs in the first turns ratio mode. An upper limit of the first switching frequency range is less than or equal to resonant frequencies of the three-phase transformer and the three-phase resonant circuit. The three-phase inverter bridge circuit is further configured to run, based on a result of comparing the parallel voltage of the two three-phase rectifier bridge circuits with another voltage threshold, at the first switching frequency or in a second switching frequency range in response to that the parallel voltage of the two three-phase rectifier bridge circuits falls within the first voltage range, or that the connection relationship switching circuit connects the two three-phase rectifier bridge circuits in parallel and the three-phase transformer runs in the second turns ratio mode. A lower limit of the second switching frequency range is greater than the resonant frequency of the three-phase resonant circuit. The another voltage threshold is greater than a lower limit of the first voltage range and less than the upper limit of the first voltage range.

In this implementation, the three-phase inverter bridge circuit runs in different switching frequency ranges in response to different voltage ranges of output ends, the three-phase transformer runs in different modes, or the two three-phase rectifier bridge circuits are connected in different manners, so that the power supply apparatus can efficiently work or meet a basic power supply efficiency requirement. In addition, a wider output voltage range is implemented.

According to a second aspect, the embodiments provide a power supply apparatus. The power supply apparatus includes at least one of a turns ratio switching circuit or a connection relationship switching circuit, a three-phase transformer, and two three-phase rectifier bridge circuits. A three-phase primary winding of the three-phase transformer is configured to receive a three-phase alternating current. A three-phase secondary winding of the three-phase transformer is configured to output a three-phase alternating current to each of the two three-phase rectifier bridge circuits. The turns ratio switching circuit is configured to switch a quantity of turns of the three-phase primary winding, to switch a running mode of the three-phase transformer. A quantity of turns of a primary winding of each phase includes a first quantity of turns and a second quantity of turns. The second quantity of turns is greater than the first quantity of turns. The connection relationship switching circuit is configured to switch a connection relationship between the two three-phase rectifier bridge circuits. The two three-phase rectifier bridge circuits are connected in series or in parallel through the connection relationship switching circuit.

According to a third aspect, the embodiments provide a three-phase transformer circuit. The three-phase transformer circuit includes a three-phase transformer and a turns ratio switching circuit. A primary winding of each phase of the three-phase transformer includes a first primary winding and a second primary winding. A secondary winding of each phase of the three-phase transformer includes a first secondary winding and a second secondary winding. A three-phase primary winding is configured to receive a three-phase alternating current. The three first secondary windings are configured to output a three-phase alternating current. The three second secondary windings are configured to output a three-phase alternating current. The turns ratio switching circuit is configured to switch a quantity of turns of the three-phase primary winding. A quantity of turns of the primary winding of each phase includes a first quantity of turns and a second quantity of turns. The first quantity of turns is equal to a quantity of turns of the first primary winding. The second quantity of turns is equal to a sum of the quantity of turns of the first primary winding and a quantity of turns of the second primary winding.

According to a fourth aspect, the embodiments further provide a charging pile. The charging pile includes the foregoing power supply apparatus. Alternatively, the charging pile includes two three-phase rectifier bridge circuits, a connection relationship switching circuit, and the foregoing three-phase transformer circuit. The three-phase transformer circuit is configured to output a three-phase alternating current to each of the two three-phase rectifier bridge circuits. The connection relationship switching circuit is configured to connect the two three-phase rectifier bridge circuits in parallel or in series.

In addition, for effects brought by any possible implementation in the second to the fourth aspects, refer to effects brought by different implementations in the first aspect. Details are not described herein again.

DETAILED DESCRIPTION OF EMBODIMENTS

In descriptions of embodiments, a connection relationship described is a direct or indirect connection. For example, that A is connected to B may be that A is directly connected to B or A is indirectly connected to B through one or more other electrical components. For example, A may be directly connected to C, and C may be directly connected to B, so that A and B are connected through C. It may be further understood that "A is connected to B" described in the embodiments may be that A is directly connected to B or A is indirectly connected to B through one or more other electrical components.

Unless otherwise specified, "/" means "or". For example, A/B may represent A or B. The term "and/or" merely describes an association relationship between associated objects and indicates that there may be three relationships. For example, A and/or B may represent the following three cases: only A exists, both A and B exist, and only B exists.

The words "first", "second", and the like are merely used to distinguish between different objects, and do not limit quantities and execution sequences. In addition, the words "first", "second", and the like are not necessarily different. In addition, terms "include", "have", or any other variant thereof are intended to cover a non-exclusive inclusion.

To make a person skilled in the art better understand the solutions provided in the embodiments, the following first describes an application scenario of the solutions provided in the embodiments.

Figure 1A:
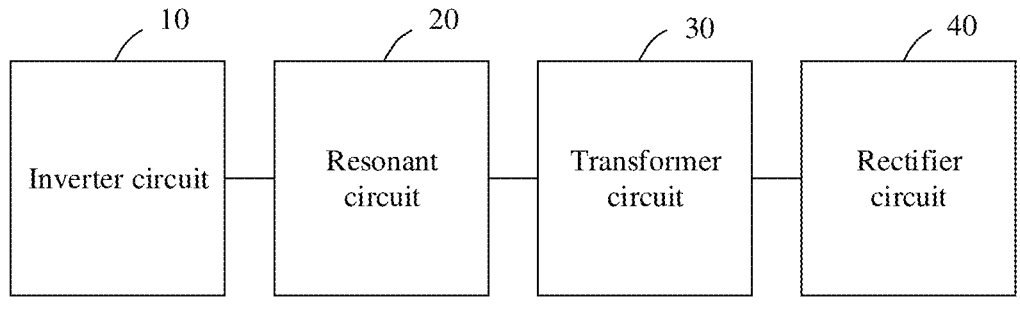
FIG. 1A is a schematic module diagram of an example of a charging pile.

FIG. 1A is a schematic diagram of an example of a charging pile. As shown in FIG. 1A, the charging pile includes an inverter circuit 10, a resonant circuit 20, a transformer circuit 30, and a rectifier circuit 40. The charging pile is configured to output a direct current to charge a battery or supply power to a load.

The inverter circuit 10 is configured to receive a direct current. The inverter circuit 10 is configured to convert the direct current into an alternating current, and then transmit the alternating current to a primary winding of the transformer circuit 30 through the resonant circuit 20. The transformer circuit 30 is configured to couple the alternating current from the primary winding of a transformer to a secondary winding. The rectifier circuit 40 is configured to convert an alternating current generated by the secondary winding of the transformer circuit 30 into a direct current. It may be understood that the charging pile further includes other circuit modules such as a filter circuit and a voltage regulator circuit. For ease of description, the other circuit modules are omitted in descriptions of the embodiments.

Charging voltages required by different types of electric vehicles can fall within different voltage ranges. For example, a charging voltage of a passenger vehicle is often in a range of 200 V to 500 V, and a charging voltage of a bus is often in a range of 300 V to 1000 V. An output voltage range of an existing charging pile is adjusted by adjusting a switching frequency of the inverter circuit 10. However, adjusting the switching frequency of the inverter circuit 10 affects conversion efficiency of the charging pile, and an implementable output voltage range is small. Therefore, it is difficult for the existing charging pile to adapt to charging voltage requirements of various types of electric vehicles. This reduces practicality of the charging pile.

To resolve the foregoing problem, embodiments provide a power supply apparatus, a three-phase transformer circuit, and a charging pile. A quantity of turns of a three-phase primary winding in the three-phase transformer circuit provided in embodiments may be switched through a turns ratio switching circuit, to adjust a turns ratio of a three-phase transformer. Output voltage ranges of the power supply apparatus and the charging pile provided in embodiments can be adjusted not only by switching the turns ratio of three-phase transformer, but also by switching a connection relationship between two three-phase rectifier bridge circuits, so that the charging pile can provide charging voltages required by various types of electric vehicles.

The three-phase transformer circuit provided in embodiments includes the three-phase transformer and the turns ratio switching circuit. A primary winding of each phase of the three-phase transformer includes a first primary winding and a second primary winding. A secondary winding of each phase of the three-phase transformer includes a first secondary winding and a second secondary winding. The three-phase primary winding is configured to receive a three-phase alternating current. The three first secondary windings are configured to output a three-phase alternating current. The three second secondary windings are configured to output a three-phase alternating current. The turns ratio switching circuit is configured to switch the quantity of turns of the three-phase primary winding. A quantity of turns of each phase includes a first quantity of turns and a second quantity of turns. The first quantity of turns is equal to a quantity of turns of the first primary winding. The second quantity of turns is equal to a sum of the quantity of turns of the first primary winding and a quantity of turns of the second primary winding.

In embodiments, the quantity of turns of the three-phase primary winding in the three-phase transformer circuit may be switched through the turns ratio switching circuit, to adjust the turns ratio of the three-phase transformer. The three-phase transformer circuit provided in embodiments may be used in the power supply apparatus and the charging pile, so that the power supply apparatus and the charging pile can provide a wide range of output voltages, and the charging pile can provide the charging voltages required by various types of electric vehicles.

The charging pile provided in embodiments includes the power supply apparatus provided in embodiments. Alternatively, the charging pile provided in embodiments includes two three-phase rectifier bridge circuits, a connection relationship switching circuit, and the three-phase transformer circuit provided in embodiments. The three-phase transformer circuit is configured to output a three-phase alternating current to each of the two three-phase rectifier bridge circuits. The connection relationship switching circuit is configured to connect the two three-phase rectifier bridge circuits in parallel or in series.

In embodiments, the output voltage range of the charging pile can be adjusted not only by switching the turns the turns ratio of three-phase transformer, but also by switching the connection relationship between the two three-phase rectifier bridge circuits, so that the charging pile can provide the charging voltages required by various types of electric vehicles.

To make a person skilled in the art better understand the solutions in the embodiments, the following clearly describes the solutions in embodiments with reference to the accompanying drawings.

Figure 1B:
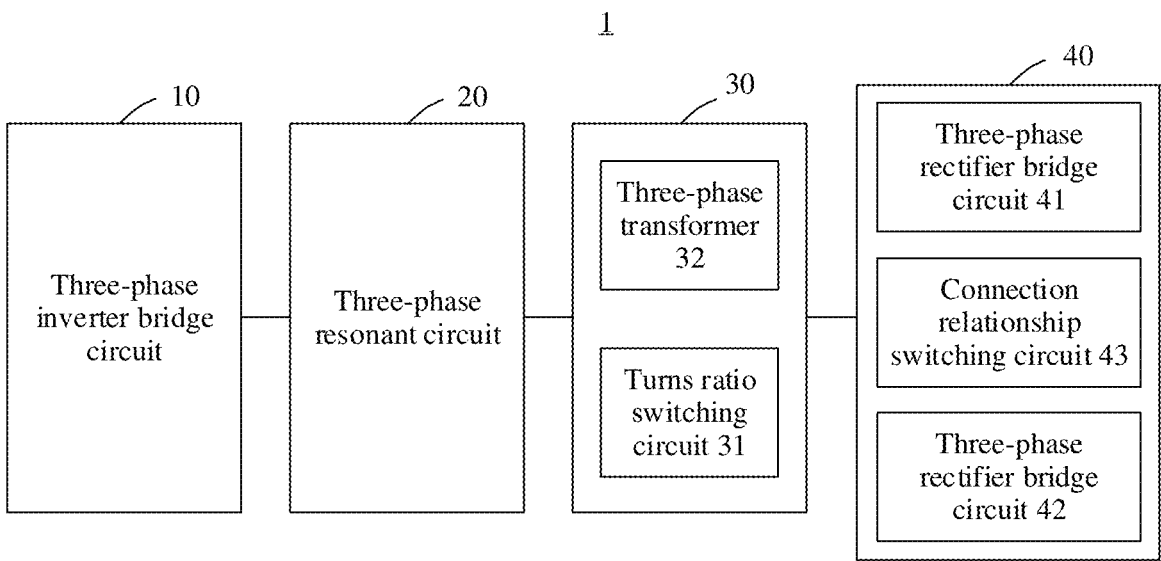
FIG. 1B is a schematic diagram of a charging pile according to an embodiment.

FIG. 1B is a schematic diagram of a charging pile according to an embodiment. As shown in FIG. 1B, a charging pile 1 is configured to output a direct current to charge a battery of an electric vehicle or supply power to a load. The charging pile 1 includes a three-phase inverter bridge circuit 10, a three-phase resonant circuit 20, a three-phase transformer circuit 30, and a rectifier circuit 40.

The three-phase inverter bridge circuit 10 is configured to receive a direct current. The three-phase inverter bridge circuit 10 is configured to convert the direct current into an alternating current, and then transmit the alternating current to a three-phase primary winding of the three-phase transformer circuit 30 through the three-phase resonant circuit 20.

The three-phase primary winding of the three-phase transformer circuit 30 is coupled to a three-phase secondary winding through a magnetic core to transmit the three-phase alternating current.

The rectifier circuit 40 is configured to convert an alternating current output by the three-phase secondary winding of the three-phase transformer circuit 30 into a direct current. In this embodiment, the rectifier circuit 40 includes two three-phase rectifier bridge circuits. The three-phase transformer circuit 30 outputs an alternating current to each of the two three-phase rectifier bridge circuits. For example, the rectifier circuit 40 includes a three-phase rectifier bridge circuit 41 and a three-phase rectifier bridge circuit 42.

It may be understood that the charging pile 1 provided in this embodiment further includes other circuit modules such as a filter circuit and a voltage regulator circuit. For ease of description, the other circuit modules are omitted in descriptions of the embodiments.

In an embodiment, the three-phase transformer circuit 30 includes a turns ratio switching circuit 31 and a three-phase transformer 32. A three-phase primary winding of the three-phase transformer 32 is configured to receive a three-phase alternating current. A three-phase secondary winding of the three-phase transformer 32 is configured to output a three-phase alternating current to each of the three-phase rectifier bridge circuit 41 and the three-phase rectifier bridge circuit 42. A quantity of turns of a primary winding of each phase of the three-phase transformer 32 includes a first quantity of turns and a second quantity of turns. A running mode of the three-phase transformer 32 includes a first turns ratio mode and a second turns ratio mode. The second quantity of turns is greater than the first quantity of turns. The first quantity of turns corresponds to the first turns ratio mode. The second quantity of turns corresponds to the second turns ratio mode. The turns ratio switching circuit 31 is configured to switch the quantity of turns of the three-phase primary winding, to switch the running mode of the three-phase transformer 32.

In an embodiment, the primary winding of each phase of the three-phase transformer 32 includes a first primary winding and a second primary winding. The three-phase primary winding is configured to receive a three-phase alternating current. For example, the three-phase primary winding is configured to receive, through the three-phase resonant circuit 20, a three-phase alternating current output by the three-phase inverter bridge circuit 10. A quantity of turns of the primary winding of each phase includes a first quantity of turns and a second quantity of turns. The first quantity of turns is equal to a quantity of turns of the first primary winding. The second quantity of turns is equal to a sum of the quantity of turns of the first primary winding and a quantity of turns of the second primary winding.

In an embodiment, a secondary winding of each phase of the three-phase transformer 32 includes a first secondary winding and a second secondary winding. For example, the three first secondary windings are configured to output a three-phase alternating current to the three-phase rectifier bridge circuit 41. The three second secondary windings are configured to output a three-phase alternating current to the three-phase rectifier bridge circuit 42.

The turns ratio switching circuit 31 in the three-phase transformer circuit 30 provided in this embodiment may switch the quantity of turns of the three-phase primary winding of the three-phase transformer 32, to switch a turns ratio of the three-phase transformer 32.

In an embodiment, the rectifier circuit 40 includes two three-phase rectifier bridge circuits (41 and 42) and a connection relationship switching circuit 43. The two three-phase rectifier bridge circuits (41 and 42) are connected in series or in parallel through the connection relationship switching circuit 43. The connection relationship switching circuit 43 is configured to switch a connection relationship between the two three-phase rectifier bridge circuits (41 and 42). For example, the three-phase rectifier bridge circuit 41 and the three-phase rectifier bridge circuit 42 are connected in series or in parallel through the connection relationship switching circuit 43.

In the charging pile 1 provided in this embodiment, the three-phase transformer circuit 30 may include only the three-phase transformer 32, and the rectifier circuit 40 may include the two three-phase rectifier bridge circuits (41 and

42) and the connection relationship switching circuit 43. Correspondingly, an output voltage range of the charging pile 1 provided in this embodiment can be adjusted by switching the connection relationship between the two three-phase rectifier bridge circuits through the connection relationship switching circuit 43, so that the charging pile 1 can provide a wide range of output voltages.

In the charging pile 1 provided in this embodiment, the three-phase transformer circuit 30 may include the turns ratio switching circuit 31 and the three-phase transformer 32, and the rectifier circuit 40 may include only the two three-phase rectifier bridge circuits (41 and 42). Correspondingly, an output voltage range of the charging pile 1 provided in this embodiment can be adjusted by switching the running mode of the three-phase transformer 32 through the turns ratio switching circuit 31, so that the charging pile 1 can provide a wide range of output voltages.

In the charging pile 1 provided in this embodiment, the three-phase transformer circuit 30 may include the turns ratio switching circuit 31 and the three-phase transformer 32, and the rectifier circuit 40 may include the two three-phase rectifier bridge circuits (41 and 42) and the connection relationship switching circuit 43. Correspondingly, an output voltage range of the charging pile 1 provided in this embodiment can be adjusted not only by switching the running mode of the three-phase transformer through the turns ratio switching circuit, but also by switching the connection relationship between the two three-phase rectifier bridge circuits through the connection relationship switching circuit, so that the charging pile 1 can provide a wide range of output voltages.

Figure 2:
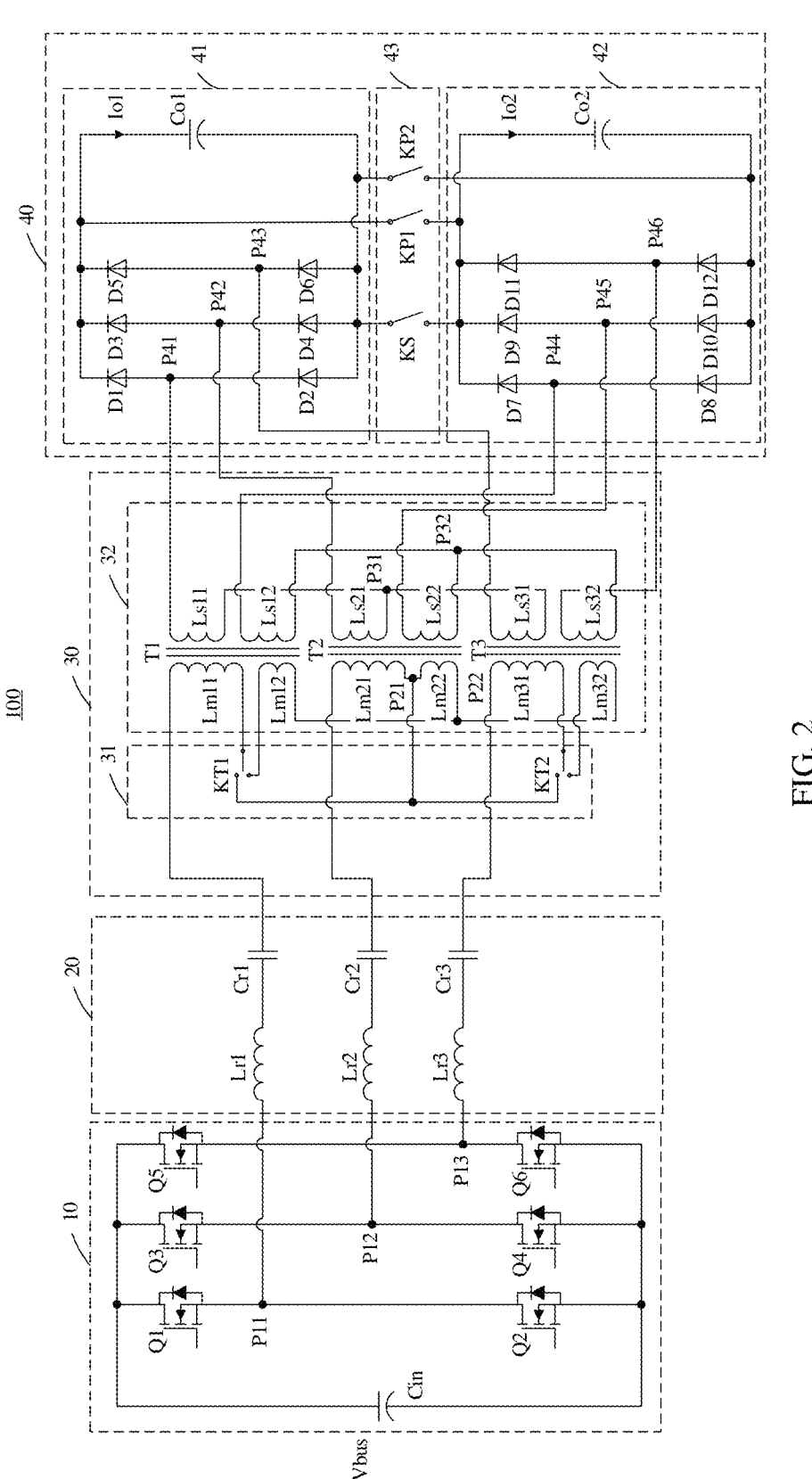
FIG. 2 is a schematic circuit diagram of a power supply apparatus according to an embodiment.

FIG. 2 is a schematic circuit diagram of a power supply apparatus 100 according to an embodiment. As shown in FIG. 2, the power supply apparatus 100 includes a three-phase transformer circuit 30 and a rectifier circuit 40. In this embodiment, the three-phase transformer circuit 30 is configured to receive, through a three-phase resonant circuit 20, a three-phase alternating current output by a three-phase inverter bridge circuit 10, and output the three-phase alternating current to the rectifier circuit 40.

In this embodiment, the three-phase inverter bridge circuit 10 is configured to convert a direct current bus voltage Vbus into the three-phase alternating current. For example, the three-phase inverter bridge circuit 10 shown in FIG. 2 includes three switching bridge arms connected in parallel and an input capacitor Cin. The three switching bridge arms connected in parallel include a first switching bridge arm, a second switching bridge arm, and a third switching bridge arm. The first switching bridge arm includes a switching transistor Q1 and a switching transistor Q2. A connection point of the switching transistor Q1 and the switching transistor Q2 is used as a bridge arm midpoint P11 of the first switching bridge arm. The second switching bridge arm includes a switching transistor Q3 and a switching transistor Q4. A connection point of the switching transistor Q3 and the switching transistor Q4 is used as a bridge arm midpoint P12 of the second switching bridge arm. The third switching bridge arm includes a switching transistor Q5 and a switching transistor Q6. A connection point of the switching transistor Q5 and the switching transistor Q5 is used as a bridge arm midpoint P13 of the third switching bridge arm. Two ends of each of the three switching bridge arms are respectively configured to be connected to two ends of the input capacitor Cin, and are respectively configured to be connected to a positive electrode and a negative electrode of a direct current bus. Control ends of the switching transistors (Q1 to Q6) of the first switching bridge arm, the second switching bridge arm, and the third switching bridge arm are configured to receive a control signal. The control signal is used to control the switching transistors to be alternately turned off and turned on, and the three-phase inverter bridge circuit 10 converts a direct current into the three-phase alternating current.

In this embodiment, the three-phase alternating current output by the three-phase inverter bridge circuit 10 may be a square wave electrical signal. There may be one or more input capacitors Cin. In an embodiment, the three-phase inverter bridge circuit 10 includes two input capacitors connected in series. In an embodiment, the three-phase inverter bridge circuit 10 includes two input capacitors connected in parallel.

In an embodiment, the switching transistor in the three-phase inverter bridge circuit 10 may be a metal-oxide-semiconductor field-effect transistor (MOSFET) or a silicon carbide metal-oxide-semiconductor (MOS) transistor. Correspondingly, the control end of the switching transistor is a gate of the MOS transistor.

In this embodiment, the three-phase resonant circuit 20 is configured to receive the three-phase alternating current output by the three-phase inverter bridge circuit 10, and output the three-phase alternating current to a three-phase primary winding of the three-phase transformer circuit 30. For example, the three-phase resonant circuit 20 shown in FIG. 2 includes a first-phase resonant circuit, a second-phase resonant circuit, and a third-phase resonant circuit. One end of the resonant circuit of each phase is connected to one bridge arm midpoint of the three-phase inverter bridge circuit 10, and the other end of the resonant circuit of each phase is connected to a primary winding of one phase of the three-phase transformer circuit 30.

The resonant circuit of each phase includes a resonant inductor and a resonant capacitor that are connected in series. For example, the first-phase resonant circuit includes a resonant inductor Lr1 and a resonant capacitor Cr1, the second-phase resonant circuit includes a resonant inductor Lr2 and a resonant capacitor Cr2, and the third-phase resonant circuit includes a resonant inductor Lr3 and a resonant capacitor Cr3. For example, as shown in FIG. 2, one end of a primary winding of a transformer of each phase of a three-phase transformer 32 is connected to one bridge arm midpoint of the three-phase inverter bridge circuit 10 through the resonant inductor and the resonant capacitor that are connected in series.

In an embodiment, resonance parameters of the resonant circuits of all phases of the three-phase resonant circuit 20 are the same. For example, inductances of the resonant inductors are the same, and capacitances of the resonant capacitors are the same. In other words, Lr1=Lr2=Lr3 and Cr1=Cr2=Cr3. It may be understood that when the resonance parameters are the same, a resonance effect of the three-phase resonant circuit 20 is better.

In this embodiment, the three-phase transformer circuit 30 includes a turns ratio switching circuit 31 and the three-phase transformer 32. The three-phase transformer 32 includes a three-phase primary winding and a three-phase secondary winding. A running mode of the three-phase transformer 32 includes a first turns ratio mode and a second turns ratio mode. The turns ratio switching circuit 31 is configured to switch the running mode of the three-phase transformer 32. For example, a quantity of turns of a primary winding of each phase of the three-phase transformer 32 includes a first quantity of turns and a second quantity of turns. The second quantity of turns is greater than the first quantity of turns. The first quantity of turns corresponds to the first turns ratio mode. The second quantity of turns corresponds to the second turns ratio mode. The turns ratio switching circuit 31 is configured to switch a quantity of turns of the three-phase primary winding of the three-phase transformer 32, to switch the running mode of the three-phase transformer 32.

It may be understood that the quantity of turns of the three-phase primary winding in the three-phase transformer circuit 30 may be switched through the turns ratio switching circuit 31, to adjust the turns ratio of the three-phase transformer 32.

In this embodiment, the primary winding of each phase of the three-phase transformer 32 includes a first primary winding and a second primary winding. One end of each of the three first primary windings of the three-phase transformer 32 is configured to receive a three-phase alternating current through the three-phase resonant circuit 20.

For example, primary windings of three phases of the three-phase transformer 32 shown in FIG. 2 are a first-phase primary winding, a second-phase primary winding, and a third-phase primary winding. The first-phase primary winding includes a first primary winding Lm11 and a second primary winding Lm12. The second-phase primary winding includes a first primary winding Lm21 and a second primary winding Lm22. The third-phase primary winding includes a first primary winding Lm31 and a second primary winding Lm32. One end of the first primary winding (Lm11, Lm21, or Lm31) of the transformer of each phase is connected to one bridge arm midpoint of the three-phase inverter bridge circuit 10 through the resonant inductor and the resonant capacitor that are connected in series in a resonant circuit of one phase.

In an embodiment, the other ends of the three second primary windings of the three-phase transformer 32 are connected. In a primary winding of one phase, the other end of the first primary winding is connected to one end of the second primary winding to form a tap. The turns ratio switching circuit 31 includes two turns ratio switching switches. The two turns ratio switching switches each are configured to connect the other end of the first primary winding to one end of the second primary winding in each of primary windings of the other two phases, or connect one end of each of the two second primary windings in primary windings of the other two phases to the tap.

For example, the other ends of the three second primary windings (Lm12, Lm22, and Lm32) in the three-phase transformer 32 shown in FIG. 2 are connected. In the second-phase primary winding, the other end of the first primary winding Lm21 is connected to one end of the second primary winding Lm22 to form a tap. The turns ratio switching circuit 31 includes a turns ratio switching switch KT1 and a turns ratio switching switch KT2. The turns ratio switching switch KT1 and the turns ratio switching switch KT2 are configured to respectively connect the other end of the first primary winding (Lm11 or Lm31) to one end of the second primary winding (Lm12 or Lm32) in the first-phase primary winding and the third-phase primary winding, or connect the other ends of the two first primary windings (Lm11 and Lm31) in the first-phase primary winding and the third-phase primary winding to the tap.

In an implementation, the turns ratio switching switch KT1 is configured to connect the other end of the first primary winding Lm11 in the first-phase primary winding to the tap. The turns ratio switching switch KT2 is configured to connect the other end of the first primary winding Lm31 in the third-phase primary winding to the tap. The other end of the first primary winding Lm11 in the first-phase primary winding is connected to the tap through the turns ratio switching switch KT1. The other end of the first primary winding Lm31 in the third-phase primary winding is connected to the tap through the turns ratio switching switch KT2. The other end of the first primary winding Lm11 in the first-phase primary winding, the other end of the first primary winding Lm21 in the second-phase primary winding, and the other end of the first primary winding Lm31 in the third-phase primary winding are connected. Correspondingly, the quantity of turns of the three-phase primary winding of the three-phase transformer 32 is the first quantity of turns, and the three-phase transformer 32 runs in the first turns ratio mode.

In an implementation, the turns ratio switching switch KT1 is configured to connect the other end of the first primary winding Lm11 to one end of the second primary winding Lm12 in the first-phase primary winding. The turns ratio switching switch KT2 is configured to connect the other end of the first primary winding Lm31 to one end of the second primary winding Lm32 in the third-phase primary winding. In the first-phase primary winding, the other end of the first primary winding Lm11 is connected to one end of the second primary winding Lm12 through the turns ratio switching switch KT1. In the second-phase primary winding, the other end of the first primary winding Lm21 is connected to one end of the second primary winding Lm22. In the third-phase primary winding, the other end of the first primary winding Lm31 is connected to one end of the second primary winding Lm32 through the turns ratio switching switch KT2. Correspondingly, the quantity of turns of the three-phase primary winding of the three-phase transformer 32 is the second quantity of turns, and the three-phase transformer 32 runs in the second turns ratio mode.

In an embodiment, in the primary winding of each phase of the three-phase transformer 32, the other end of the first primary winding is connected to one end of the second primary winding to form a tap. The turns ratio switching circuit 31 includes three turns ratio switching switches. The three turns ratio switching switches are respectively configured to sequentially connect the three first primary windings in the three-phase primary winding through the three taps, or sequentially connect the primary windings of the three phases through the other ends of the three second primary windings.

Figure 3:
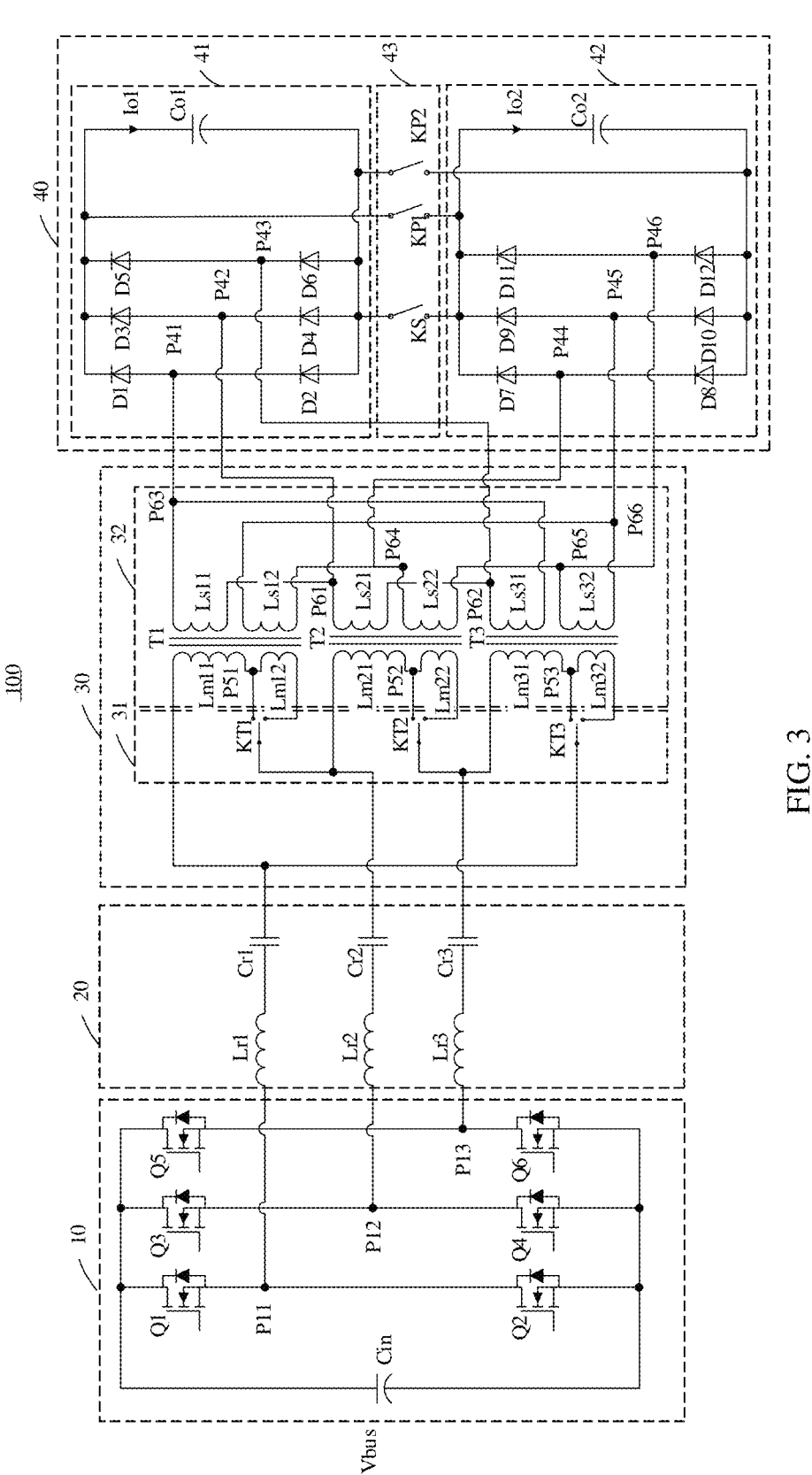
FIG. 3 is a schematic running diagram of a power supply apparatus according to an embodiment.

For example, in the primary winding of each phase of the three-phase transformer 32 shown in FIG. 3, the other end of the first primary winding (Lm11, Lm21, or Lm31) is connected to one end of the second primary winding (Lm12, Lm22, or Lm32) to form a tap. For example, in the first-phase primary winding, the other end of the first primary winding Lm11 is connected to one end of the second primary winding Lm12 to form a tap P51. In the second-phase primary winding, the other end of the first primary winding Lm21 is connected to one end of the second primary winding Lm22 to form a tap P52. In the third-phase primary winding, the other end of the first primary winding Lm31 is connected to one end of the second primary winding Lm32 to form a tap P53.

The turns ratio switching circuit 31 includes a turns ratio switching switch KT1, a turns ratio switching switch KT2, and a turns ratio switching switch KT3. The turns ratio switching switch KT1, the turns ratio switching switch KT2, and the turns ratio switching switch KT3 are respectively configured to sequentially connect the three first primary windings (Lm11, Lm21, and Lm31) in the three-phase primary winding through the three taps, so that the quantity of turns of the three-phase primary winding of the three-phase transformer 32 is the first quantity of turns, or sequentially connect the primary windings of the three phases through the other ends of the three second primary windings (Lm12, Lm22, and Lm32), so that the quantity of turns of the three-phase primary winding of the three-phase transformer 32 is the second quantity of turns.

In an implementation, the turns ratio switching switch KT1 is configured to connect the tap P51 of the first-phase primary winding to one end of the first primary winding Lm21 of the second-phase primary winding. The turns ratio switching switch KT2 is configured to connect the tap P52 of the second-phase primary winding to one end of the first primary winding Lm31. The turns ratio switching switch KT3 is configured to connect the tap P53 of the third-phase primary winding to one end of the first primary winding Lm11. Correspondingly, the three first primary windings (Lm11, Lm21, and Lm31) are sequentially connected. The tap P51 of the first-phase primary winding is connected to one end of the first primary winding Lm21 through the turns ratio switching switch KT1. The tap P52 of the second-phase primary winding is connected to one end of the first primary winding Lm31 through the turns ratio switching switch KT2. The tap P53 of the third-phase primary winding is connected to one end of the first primary winding Lm11 through the turns ratio switching switch KT3. Correspondingly, the quantity of turns of the three-phase primary winding of the three-phase transformer 32 is the first quantity of turns, and the three-phase transformer 32 runs in the first turns ratio mode.

In an implementation, the turns ratio switching switch KT1 is configured to connect the other end of the second primary winding Lm12 of the first-phase primary winding to one end of the first primary winding Lm21 of the second-phase primary winding. The turns ratio switching switch KT2 is configured to connect the other end of the second primary winding Lm22 of the second-phase primary winding to one end of the third primary winding Lm31. The turns ratio switching switch KT3 is configured to connect the other end of the second primary winding Lm32 of the third-phase primary winding to one end of the first primary winding Lm11. Correspondingly, the primary windings of the three phases are sequentially connected. The other end of the second primary winding Lm12 is connected to one end of the first primary winding Lm21 through the turns ratio switching switch KT1. The other end of the second primary winding Lm22 is connected to one end of the first primary winding Lm31 through the turns ratio switching switch KT2. The other end of the second primary winding Lm32 is connected to one end of the first primary winding Lm11 through the turns ratio switching switch KT3. Correspondingly, the quantity of turns of the three-phase primary winding of the three-phase transformer 32 is the second quantity of turns, and the three-phase transformer 32 runs in the second turns ratio mode.

In this embodiment, a secondary winding of each phase of the three-phase transformer 32 includes a first secondary winding and a second secondary winding. The three first secondary windings of the three-phase transformer 32 are configured to output a three-phase alternating current to a three-phase rectifier bridge circuit 41. The three second secondary windings of the three-phase transformer 32 are configured to output a three-phase alternating current to a three-phase rectifier bridge circuit 42.

For example, secondary windings of the three phases of the three-phase transformer 32 shown in FIG. 2 are a first-phase secondary winding, a second-phase secondary winding, and a third-phase secondary winding. The first-phase secondary winding includes a first secondary winding Ls11 and a second secondary winding Ls12. The second-phase secondary winding includes a first secondary winding Ls21 and a second secondary winding Ls22. The third-phase secondary winding includes a first secondary winding Ls31 and a second secondary winding Ls32. One end of each of the three first secondary windings (Ls11, Ls21, and Ls31) is configured to output a three-phase alternating current to the three-phase rectifier bridge circuit 41. One end of each of the three second secondary windings (Ls12, Ls22, and Ls32) is configured to output a three-phase alternating current to the three-phase rectifier bridge circuit 42.

In an embodiment, in the three-phase transformer 32, the other ends of the three first secondary windings are connected, and the other ends of the three second secondary windings are connected. For example, the other end of the first secondary winding Ls11 of the first-phase secondary winding, the other end of the first secondary winding Ls21 of the second-phase secondary winding, and the other end of the first secondary winding Ls31 of the third-phase secondary winding are connected. The other end of the second secondary winding Ls12 of the first-phase secondary winding, the other end of the second secondary winding Ls22 of the second-phase secondary winding, and the other end of the second secondary winding Ls32 of the third-phase secondary winding are connected.

In an embodiment, in the three-phase transformer 32, the three first secondary windings are sequentially connected, and the three second secondary windings are sequentially connected. For example, the other end of the first secondary winding Ls11 of the first-phase secondary winding is connected to one end of the first secondary winding Ls21 of the second-phase secondary winding, the other end of the first secondary winding Ls21 of the second-phase secondary winding is connected to one end of the first secondary winding Ls31 of the third-phase secondary winding, and the other end of the first secondary winding Ls31 of the third-phase secondary winding is connected to one end of the first secondary winding Ls11 of the first-phase secondary winding. The other end of the second secondary winding Ls12 of the first-phase secondary winding is connected to one end of the second secondary winding Ls22 of the second-phase secondary winding, the other end of the second secondary winding Ls22 of the second-phase secondary winding is connected to one end of the second secondary winding Ls32 of the third-phase secondary winding, and the other end of the second secondary winding Ls32 of the third-phase secondary winding is connected to one end of the second secondary winding Ls12 of the first-phase secondary winding.

For example, both the three-phase rectifier bridge circuit 41 and the three-phase rectifier bridge circuit 42 shown in FIG. 2 are three-phase diode full-bridge circuits. The three-phase rectifier bridge circuit 41 includes a first rectifier bridge arm, a second rectifier bridge arm, a third rectifier bridge arm, and a first output capacitor Co1. The three-phase rectifier bridge circuit 42 includes a fourth rectifier bridge arm, a fifth rectifier bridge arm, a sixth rectifier bridge arm, and a second output capacitor Co2. Each rectifier bridge arm includes two diodes connected in series.

For example, a diode D1 and a diode D2 in the three-phase rectifier bridge circuit 41 are connected in series to form the first rectifier bridge arm, and a bridge arm midpoint is P41. A diode D3 and a diode D4 are connected in series to form the second rectifier bridge arm, and a bridge arm midpoint is P42. A diode D5 and a diode D6 are connected in series to form the third rectifier bridge arm, and a bridge arm midpoint is P43. The first rectifier bridge arm, the second rectifier bridge arm, and the third rectifier bridge arm are connected in parallel. One end of each of the three first secondary windings (Ls11, Ls21, and Ls31) is connected to one of the three bridge arm midpoints (P41, P42, and P43) of the three-phase rectifier bridge circuit 41.

For example, in the three-phase rectifier bridge circuit 41, the diode D1, the diode D3, and the diode D5 are connected in a common-cathode manner to form a negative electrode of the three-phase rectifier bridge circuit 41. The diode D2, the diode D4, and the diode D6 are connected in a common-anode manner to form a positive electrode of the three-phase rectifier bridge circuit 41. Two ends of the three-phase rectifier bridge circuit 41 are respectively connected to two ends of the first output capacitor Co1 and provide an output voltage Vout1.

For example, a diode D7 and a diode D8 in the three-phase rectifier bridge circuit 42 are connected in series to form the fourth rectifier bridge arm, and a bridge arm midpoint is P44. A diode D9 and a diode D10 are connected in series to form the fifth rectifier bridge arm, and a bridge arm midpoint is P45. A diode D11 and a diode D12 are connected in series to form the sixth rectifier bridge arm, and a bridge arm midpoint is P46. The fourth rectifier bridge arm, the fifth rectifier bridge arm, and the sixth rectifier bridge arm are connected in parallel. One end of each of the three second secondary windings (Ls12, Ls22, and Ls32) is connected to one of the three bridge arm midpoints (P44, P45, and P46) of the three-phase rectifier bridge circuit 42.

For example, in the three-phase rectifier bridge circuit 42, the diode D7, the diode D9, and the diode D11 are connected in a common-cathode manner to form a negative electrode of the three-phase rectifier bridge circuit 42, and the diode D8, the diode D10, and the diode D12 are connected in a common-anode manner to form a positive electrode of the three-phase rectifier bridge circuit 42. Two ends of the three-phase rectifier bridge circuit 42 are respectively connected to two ends of the second output capacitor Co2 and provide an output voltage Vout2.

In this embodiment, the two three-phase rectifier bridge circuits are connected in series or in parallel through a connection relationship switching circuit 43. The connection relationship switching circuit 43 is configured to adjust an output voltage of the power supply apparatus 100 by switching a connection relationship between the two three-phase rectifier bridge circuits.

In this embodiment, the connection relationship switching circuit 43 includes a series switch and two parallel switches. The series switch is configured to connect the two three-phase rectifier bridge circuits in series. Two ends of the series switch are respectively connected to a positive electrode of one three-phase rectifier bridge circuit and a negative electrode of the other three-phase rectifier bridge circuit. Two ends of one parallel switch are respectively connected to negative electrodes of the two three-phase rectifier bridge circuits, and two ends of the other parallel switch are respectively connected to positive electrodes of the two three-phase rectifier bridge circuits.

For example, as shown in FIG. 2, the connection relationship switching circuit 43 includes a series switch KS and two parallel switches (KP1 and KP2). The series switch KS is configured to connect the three-phase rectifier bridge circuit 41 and the three-phase rectifier bridge circuit 42 in series. For example, one end of the series switch KS is configured to be connected to the negative electrode of the three-phase rectifier bridge circuit 42, and the other end of the series switch KS is configured to be connected to the positive electrode of the three-phase rectifier bridge circuit 41. The two parallel switches are configured to connect the three-phase rectifier bridge circuit 41 and the three-phase rectifier bridge circuit 42 in parallel. For example, two ends of the parallel switch KP1 are respectively connected to the positive electrodes of the three-phase rectifier bridge circuit 41 and the three-phase rectifier bridge circuit 42. Two ends of the parallel switch KP2 are respectively connected to the negative electrodes of the three-phase rectifier bridge circuit 41 and the three-phase rectifier bridge circuit 42.

In an embodiment, the connection relationship switching circuit 43 is configured to connect the two three-phase rectifier bridge circuits in series. For example, the series switch is closed, and the two parallel switches are opened. For example, the series switch KS is closed, and the two parallel switches (KP1 and KP2) are opened. Correspondingly, an output voltage of the rectifier circuit 40 is a series voltage of the three-phase rectifier bridge circuit 41 and the three-phase rectifier bridge circuit 42.

In an embodiment, the connection relationship switching circuit 43 is configured to connect the two three-phase rectifier bridge circuits in parallel. For example, the series switch is opened, and the two parallel switches are closed. For example, the series switch KS is opened, and the two parallel switches (KP1 and KP2) are closed. Correspondingly, an output voltage of the rectifier circuit 40 is a parallel voltage of the three-phase rectifier bridge circuit 41 and the three-phase rectifier bridge circuit 42.

In this embodiment, the turns ratio switching circuit 31 or the connection relationship switching circuit 43 is configured to adjust an output voltage range of the power supply apparatus 100. For example, in response to switching the running mode of the three-phase transformer 32 by the turns ratio switching circuit 31 and switching the connection relationship between the two three-phase rectifier bridge circuits by the connection relationship switching circuit 43, the output voltage of the power supply apparatus 100 falls within at least one of a first voltage range, a second voltage range, a third voltage range, or a fourth voltage range. An upper limit of the first voltage range is less than or equal to a lower limit of the second voltage range. An upper limit of the third voltage range is less than or equal to a lower limit of the fourth voltage range.

For example, refer to Table 1 below. The power supply apparatus 100 has four working modes. The four working modes of the power supply apparatus 100 respectively correspond to four ranges of output voltages. That is, the output voltage of the power supply apparatus 100 running in a first working mode falls within the first voltage range. The output voltage of the power supply apparatus 100 running in a second working mode falls within the second voltage range. The output voltage of the power supply apparatus 100 running in a third working mode falls within the third voltage range. The output voltage of the power supply apparatus 100 running in a fourth working mode falls within the fourth voltage range.

In response to switching the running mode of the three-phase transformer 32 to the second turns ratio mode by the turns ratio switching circuit 31 and switching the connection relationship between the two three-phase rectifier bridge circuits to a parallel connection relationship by the connection relationship switching circuit 43, the power supply apparatus 100 runs in the first working mode, and the output voltage of the power supply apparatus 100 falls within the first voltage range.

In response to switching the running mode of the three-phase transformer 32 to the first turns ratio mode by the turns ratio switching circuit 31 and switching the connection relationship between the two three-phase rectifier bridge circuits to the parallel connection relationship by the connection relationship switching circuit 43, the power supply apparatus 100 runs in the second working mode, and the output voltage of the power supply apparatus 100 falls within the second voltage range.

In response to switching the running mode of the three-phase transformer 32 to the second turns ratio mode by the turns ratio switching circuit 31 and switching the connection relationship between the two three-phase rectifier bridge circuits to a series connection relationship by the connection relationship switching circuit 43, the power supply apparatus 100 runs in the third working mode, and the output voltage of the power supply apparatus 100 falls within the third voltage range.

In response to switching the running mode of the three-phase transformer 32 to the first turns ratio mode by the turns ratio switching circuit 31 and switching the connection relationship between the two three-phase rectifier bridge circuits to the series connection relationship by the connection relationship switching circuit 43, the power supply apparatus 100 runs in the fourth working mode, and the output voltage of the power supply apparatus 100 falls within the fourth voltage range.

TABLE 1

| Working mode | Output voltage | Running mode of the three-phase transformer | Connection manner of the three-phase rectifier bridge circuits |
|---|---|---|---|
| First working mode | First voltage range | Second turns ratio mode | Parallel connection |
| Second working mode | Second voltage range | First turns ratio mode | Parallel connection |
| Third working mode | Third voltage range | Second turns ratio mode | Series connection |
| Fourth working mode | Fourth voltage range | First turns ratio mode | Series connection |

For example, the first voltage range corresponding to the first working mode is 200 V to 320 V, the second voltage range corresponding to the second working mode is 320 V to 500 V, the third voltage range corresponding to the third working mode is 500 V to 640 V, and the fourth voltage range corresponding to the fourth working mode is 640 V to 1000 V.

In an embodiment, the turns ratio switching circuit 31 is configured to: in response to connecting the two three-phase rectifier bridge circuits in parallel by the connection relationship switching circuit 43, switch the running mode of the three-phase transformer 32, so that the power supply apparatus 100 outputs a voltage within the first voltage range or the second voltage range. The turns ratio switching circuit 31 is further configured to: in response to connecting the two three-phase rectifier bridge circuits in series by the connection relationship switching circuit 43, switch the running mode of the three-phase transformer 32, so that the power supply apparatus 100 outputs a voltage within the third voltage range or the fourth voltage range.

In an implementation, the connection relationship switching circuit 43 connects the three-phase rectifier bridge circuit 41 and the three-phase rectifier bridge circuit 42 in parallel. The turns ratio switching circuit 31 can switch the running mode of the three-phase transformer 32 to the first turns ratio mode or the second turns ratio mode. The turns ratio switching circuit 31 switches the running mode of the three-phase transformer 32 to the second turns ratio mode, so that the power supply apparatus 100 outputs the voltage within the first voltage range. The turns ratio switching circuit 31 switches the running mode of the three-phase transformer 32 to the first turns ratio mode, so that the power supply apparatus 100 outputs the voltage within the second voltage range.

In another implementation, the connection relationship switching circuit 43 connects the three-phase rectifier bridge circuit 41 and the three-phase rectifier bridge circuit 42 in series. The turns ratio switching circuit 31 can switch the running mode of the three-phase transformer 32 to the first turns ratio mode or the second turns ratio mode. The turns ratio switching circuit 31 switches the running mode of the three-phase transformer 32 to the second turns ratio mode, so that the power supply apparatus 100 outputs the voltage within the third voltage range. The turns ratio switching circuit 31 switches the running mode of the three-phase transformer 32 to the first turns ratio mode, so that the power supply apparatus 100 outputs the voltage within the fourth voltage range.

The three-phase transformer circuit 30 provided in this embodiment performs switching through the turns ratio switching circuit 31, to adjust the running mode of the three-phase transformer 32.

The power supply apparatus 100 provided in this embodiment may adjust the output voltage by adjusting only the running mode of the three-phase transformer 32.

The power supply apparatus 100 provided in this embodiment may adjust the output voltage by adjusting both the running mode of the three-phase transformer 32 and the connection manner of the two three-phase rectifier bridge circuits.

For example, the turns ratio switching circuit 31 is configured to switch the running mode of the three-phase transformer 32 in response to a result of comparing a series voltage or a parallel voltage of the two three-phase rectifier bridge circuits with at least one preset voltage. The at least one preset voltage includes an upper limit or a lower limit of at least one of the first voltage range, the second voltage range, the third voltage range, or the fourth voltage range.

For example, the parallel voltage of the two three-phase rectifier bridge circuits falls within the first voltage range or the second voltage range. The upper limit of the first voltage range is less than or equal to the lower limit of the second voltage range. The preset voltage is the upper limit of the first voltage range or the lower limit of the second voltage range. The turns ratio switching circuit 31 is configured to switch the running mode of the three-phase transformer 32 in response to a result of comparing the parallel voltage of the two three-phase rectifier bridge circuits with the upper limit of the first voltage range or the lower limit of the second voltage range. For example, the turns ratio switching circuit 31 enables the three-phase transformer 32 to run in the second turns ratio mode in response to that the parallel voltage of the two three-phase rectifier bridge circuits is less than the upper limit of the first voltage range or less than the lower limit of the second voltage range. For another example, the turns ratio switching circuit 31 enables the three-phase transformer 32 to run in the first turns ratio mode in response to that the parallel voltage of the two three-phase rectifier bridge circuits is greater than the upper limit of the first voltage range or greater than the lower limit of the second voltage range.

For example, the series voltage of the two three-phase rectifier bridge circuits falls within the third voltage range or the fourth voltage range. The upper limit of the third voltage range is less than or equal to the lower limit of the fourth voltage range. The preset voltage is the upper limit of the third voltage range or the lower limit of the fourth voltage range. The turns ratio switching circuit 31 is configured to switch the running mode of the three-phase transformer 32 in response to a result of comparing the series voltage of the two three-phase rectifier bridge circuits with the upper limit of the third voltage range or the lower limit of the fourth voltage range. For example, the turns ratio switching circuit 31 enables the three-phase transformer 32 to run in the second turns ratio mode in response to that the series voltage of the two three-phase rectifier bridge circuits is less than the upper limit of the third voltage range or less than the lower limit of the fourth voltage range. For another example, the turns ratio switching circuit 31 enables the three-phase transformer 32 to run in the first turns ratio mode in response to that the series voltage of the two three-phase rectifier bridge circuits is greater than the upper limit of the third voltage range or less than the lower limit of the fourth voltage range.

It may be understood that the series voltage or the parallel voltage of the two three-phase rectifier bridge circuits is an output voltage after the power supply apparatus 100 is connected to a load. A voltage range within which a power supply voltage required by the load falls can be obtained through a result of comparing the preset voltage with upper limits or lower limits of different voltage ranges. The running mode of the three-phase transformer 32 is adjusted based on the voltage range within which the power supply voltage required by the load falls, to meet a voltage requirement of the load.

For example, the connection relationship switching circuit 43 is configured to: in response to running in the first turns ratio mode by the three-phase transformer 32, switch the connection relationship between the two three-phase rectifier bridge circuits, so that the power supply apparatus 100 outputs a voltage within the second voltage range or the fourth voltage range.

For example, the connection relationship switching circuit 43 is configured to: in response to running in the second turns ratio mode by the three-phase transformer 32, switch the connection relationship between the two three-phase rectifier bridge circuits, so that the power supply apparatus 100 outputs a voltage within the first voltage range or the third voltage range.

For example, the three-phase transformer 32 runs in the first turns ratio mode. The connection relationship switching circuit 43 can switch the connection relationship between the two three-phase rectifier bridge circuits, so that the power supply apparatus 100 outputs the voltage within the second voltage range or the fourth voltage range. The connection relationship switching circuit 43 connects the two three-phase rectifier bridge circuits in parallel, so that the power supply apparatus 100 outputs the voltage within the second voltage range. The connection relationship switching circuit 43 connects the two three-phase rectifier bridge circuits in series, so that the power supply apparatus 100 outputs the voltage within the fourth voltage range.

For example, the three-phase transformer 32 runs in the second turns ratio mode. The connection relationship switching circuit 43 can switch the connection relationship between the two three-phase rectifier bridge circuits, so that the power supply apparatus 100 outputs the voltage within the first voltage range or the third voltage range. The connection relationship switching circuit 43 connects the two three-phase rectifier bridge circuits in parallel, so that the power supply apparatus 100 outputs the voltage within the first voltage range. The connection relationship switching circuit 43 connects the two three-phase rectifier bridge circuits in series, so that the power supply apparatus 100 outputs the voltage within the third voltage range.

The power supply apparatus 100 provided in this embodiment may adjust the output voltage by switching the connection manner of the two three-phase rectifier bridge circuits through the connection relationship switching circuit 43. Alternatively, the power supply apparatus 100 provided in this embodiment may adjust the output voltage by adjusting both the connection manner of the two three-phase rectifier bridge circuits and the running mode of the three-phase transformer 32.

In an embodiment, the connection relationship switching circuit 43 is configured to switch the connection relationship between the two three-phase rectifier bridge circuits in response to a result of comparing a series voltage or a parallel voltage of the two three-phase rectifier bridge circuits with at least one preset voltage. The at least one preset voltage includes an upper limit or a lower limit of at least one of the first voltage range, the second voltage range, the third voltage range, or the fourth voltage range.

For example, the parallel voltage of the two three-phase rectifier bridge circuits falls within the first voltage range, and the series voltage of the two three-phase rectifier bridge circuits falls within the third voltage range. The upper limit of the first voltage range is less than or equal to a lower limit of the third voltage range. The preset voltage is the upper limit of the first voltage range or the lower limit of the third voltage range.

For example, the connection relationship switching circuit 43 is configured to switch the connection manner of the two three-phase rectifier bridge circuits in response to a result of comparing the parallel voltage or the series voltage of the two three-phase rectifier bridge circuits with the upper limit of the first voltage range or the lower limit of the third voltage range.

For example, the connection relationship switching circuit 43 enables the two three-phase rectifier bridge circuits to be connected in parallel in response to that the parallel voltage of the two three-phase rectifier bridge circuits is less than the upper limit of the first voltage range or the lower limit of the third voltage range. For another example, the connection relationship switching circuit 43 is configured to enable the two three-phase rectifier bridge circuits to be connected in series in response to that the series voltage of the two three-phase rectifier bridge circuits is greater than the upper limit of the first voltage range or the lower limit of the third voltage range.

For example, the parallel voltage of the two three-phase rectifier bridge circuits falls within the second voltage range, and the series voltage of the two three-phase rectifier bridge circuits falls within the fourth voltage range. An upper limit of the second voltage range is less than or equal to the lower limit of the fourth voltage range. The preset voltage is the upper limit of the second voltage range or the lower limit of the fourth voltage range.

For example, the connection relationship switching circuit 43 is configured to switch the connection manner of the two three-phase rectifier bridge circuits in response to a result of comparing the parallel voltage or the series voltage of the two three-phase rectifier bridge circuits with the upper limit of the second voltage range or the lower limit of the fourth voltage range.

For example, the connection relationship switching circuit 43 enables the two three-phase rectifier bridge circuits to be connected in parallel in response to that the parallel voltage of the two three-phase rectifier bridge circuits is less than the upper limit of the second voltage range or the lower limit of the fourth voltage range. For another example, the connection relationship switching circuit 43 enables the two three-phase rectifier bridge circuits to be connected in series in response to that the series voltage of the two three-phase rectifier bridge circuits is greater than the upper limit of the second voltage range or the lower limit of the fourth voltage range.

It may be understood that the series voltage or the parallel voltage of the two three-phase rectifier bridge circuits is an output voltage after the power supply apparatus 100 is connected to a load. A voltage range within which a power supply voltage required by the load falls can be obtained through a result of comparing the preset voltage with upper limits or lower limits of different voltage ranges. The connection manner of the two three-phase rectifier bridge circuits is adjusted based on the voltage range within which the power supply voltage required by the load falls, to meet a voltage requirement of the load.

It may be understood that in some embodiments, when the power supply apparatus 100 matches a load, the turns ratio switching circuit 31 and the connection relationship switching circuit 43 can simultaneously adjust the running mode of the three-phase transformer 32 and the connection manner of the two three-phase rectifier bridge circuits based on a plurality of preset voltage thresholds.

In this embodiment, the power supply apparatus 100 may further adjust a switching frequency of the three-phase inverter bridge circuit 10, to match loads with different voltage requirements. The power supply apparatus 100 divides a wide range of output voltages into a plurality of voltage ranges. In each working mode, the switching frequency of the three-phase inverter bridge circuit 10 needs to be adjusted only in one of the voltage ranges. In this way, a range in which the power supply apparatus 100 needs to adjust the switching frequency is small, so that the power supply apparatus 100 can keep working efficiently.

In this embodiment, the three bridge arm midpoints of the three-phase inverter bridge circuit 10 output a three-phase alternating current to the three primary windings of the three-phase transformer 32 through the three-phase resonant circuit 20.

In an embodiment, the three-phase inverter bridge circuit 10 runs in a first switching frequency range in response to that a parallel voltage of the two three-phase rectifier bridge circuits falls within the second voltage range, that a series voltage of the two three-phase rectifier bridge circuits falls within the third voltage range or the fourth voltage range, that the connection relationship switching circuit 43 connects the two three-phase rectifier bridge circuits in series, or that the connection relationship switching circuit connects the two three-phase rectifier bridge circuits in parallel and the three-phase transformer 32 runs in the first turns ratio mode. An upper limit of the first switching frequency range is less than or equal to resonant frequencies of the three-phase transformer 32 and the three-phase resonant circuit 20.

It may be understood that the switching frequency of the three-phase inverter bridge circuit 10 is less than or equal to the resonant frequency of the three-phase resonant circuit 20 and the power supply apparatus 100 can be in an efficient working range. In other words, the three-phase inverter bridge circuit 10 runs in the first switching frequency range, and the power supply apparatus 100 can be in the efficient working range.

For example, when the three-phase inverter bridge circuit 10 runs in the first switching frequency range, an output current of the three-phase inverter bridge circuit 10 is discontinuous, a turn-off loss of the switching transistor in the three-phase inverter bridge circuit 10 is small, and a rectifier diode located on a secondary side of the transformer has no reverse recovery loss. Therefore, the power supply apparatus 100 in the efficient working range, and the power supply apparatus 100 has higher power supply efficiency.

In an embodiment, the three-phase inverter bridge circuit 10 runs, based on a result of comparing the parallel voltage of the two three-phase rectifier bridge circuits with another voltage threshold, at the first switching frequency or in a second switching frequency range in response to that the parallel voltage of the two three-phase rectifier bridge circuits falls within the first voltage range, or that the connection relationship switching circuit 43 connects the two three-phase rectifier bridge circuits in parallel and the three-phase transformer 32 runs in the second turns ratio mode. A lower limit of the second switching frequency range is greater than the resonant frequency of the three-phase resonant circuit 20. The another voltage threshold is greater than a lower limit of the first voltage range and less than the upper limit of the first voltage range.

For example, the first voltage range is 200 V to 320 V. The another voltage threshold is 250 V.

In an implementation, the three-phase inverter bridge circuit 10 runs in the first switching frequency range in response to that the parallel voltage of the two three-phase rectifier bridge circuits is greater than or equal to the another voltage threshold.

In another implementation, the three-phase inverter bridge circuit 10 runs in the second switching frequency range in response to that the parallel voltage of the two three-phase rectifier bridge circuits is less than the another voltage threshold. The three-phase inverter bridge circuit 10 runs in the second switching frequency range, and the lower limit of the second switching frequency range is greater than the resonant frequency of the three-phase resonant circuit 20.

It may be understood that when the three-phase inverter bridge circuit 10 runs in the second switching frequency range, an output current of the three-phase inverter bridge circuit 10 is continuous, a turn-off loss of the switching transistor in the three-phase inverter bridge circuit 10 is large, and a rectifier diode located on a secondary side of the transformer has a reverse recovery loss. However, because the output voltage is low, the reverse recovery loss falls within an acceptable range, and the power supply apparatus 100 can still work normally to meet an efficiency requirement of the power supply apparatus 100.

Additionally, in the power supply apparatus 100 provided in this embodiment, the three-phase transformer 32 runs in different modes, or the two three-phase rectifier bridge circuits are connected in different manners, and the three-phase inverter bridge circuit 10 runs in different switching frequency ranges, so that the power supply apparatus 100 can balance power supply efficiency and a wide range of output voltages.

In this embodiment, a turns ratio of the primary winding and the secondary winding of each phase of the three-phase transformer 32 can be set as required.

In this embodiment, the running mode of the three-phase transformer 32 is fixed. A voltage output by the power supply apparatus 100 when the two three-phase rectifier bridge circuits are connected in series is twice a voltage output by the power supply apparatus 100 when the two three-phase rectifier bridge circuits are connected in parallel. Therefore, a range of the output voltage of the power supply apparatus 100 may be divided into a low-voltage range and a high-voltage range based on the connection manner of the two three-phase rectifier bridge circuits.

When the two three-phase rectifier bridge circuits are connected in parallel, the output voltage of the power supply apparatus 100 falls within the low-voltage range. When the two three-phase rectifier bridge circuits are connected in series, the output voltage of the power supply apparatus 100 falls in the high-voltage range. The low-voltage range includes the first voltage range and the second voltage range. The high-voltage range includes the third voltage range and the fourth voltage range. An upper limit of the high-voltage range is twice a lower limit of the low-voltage range.

A resonance point voltage of the three-phase resonant circuit 20 can be determined based on the high-voltage range, the low-voltage range, and the input bus voltage Vbus. A quantity of turns of the first primary winding and a quantity of turns of the second primary winding in the three-phase transformer 32 are determined based on the input bus voltage Vbus and the resonance point voltage designed for the high-voltage range and the low-voltage range.

For example, when the bus voltage Vbus is 800 V and a maximum range of the output voltage is 200 V to 1000 V, a critical voltage between the high-voltage range and the low-voltage range is half of an upper limit of the maximum range, for example, 500 V. In this way, the high-voltage range is determined as 500 V to 1000 V, and the low-voltage range is determined as 250 V to 500 V. When the three-phase transformer 32 runs in the first turns ratio mode, a turns ratio of the primary winding, the first secondary winding, and the second secondary winding is 13:5:5, where the primary winding includes the first primary winding. When the three-phase transformer 32 runs in the second turns ratio mode, a turns ratio of the primary winding, the first secondary winding, and the second secondary winding is 16:5:5, where the primary winding includes the first primary winding and the second primary winding.

In an embodiment, the secondary winding of each phase of the three-phase transformer 32 has a same quantity of turns, and a quantity of turns of the first secondary winding is equal to a quantity of turns of the second secondary winding.

For example, in response to that the connection relationship switching circuit 43 is configured to connect the two three-phase rectifier bridge circuits in series, an output voltage Vo1 of the three-phase rectifier bridge circuit 41 is equal to an output voltage Vo2 of the three-phase rectifier bridge circuit 42, and an output voltage Vo of the power supply apparatus 100 is as follows: Vo=2Vo1=2Vo2.

For example, in response to that the connection relationship switching circuit 43 is configured to connect the two three-phase rectifier bridge circuits in parallel, a current Io1 of the three-phase rectifier bridge circuit 41 is equal to a current Io2 of the three-phase rectifier bridge circuit 42, and an output current Io of the power supply apparatus 100 is as follows: Io=Io1=Io2. In other words, a voltage is automatically equalized between the two three-phase rectifier bridge circuits connected in series, and a current is automatically equalized between the two three-phase rectifier bridge circuits connected in parallel.

In this embodiment, different working modes of the power supply apparatus 100 correspond to different ranges of output voltages. The following separately describes a running principle of the power supply apparatus 100 with reference to FIG. 4 to FIG. 7.

Figure 4:
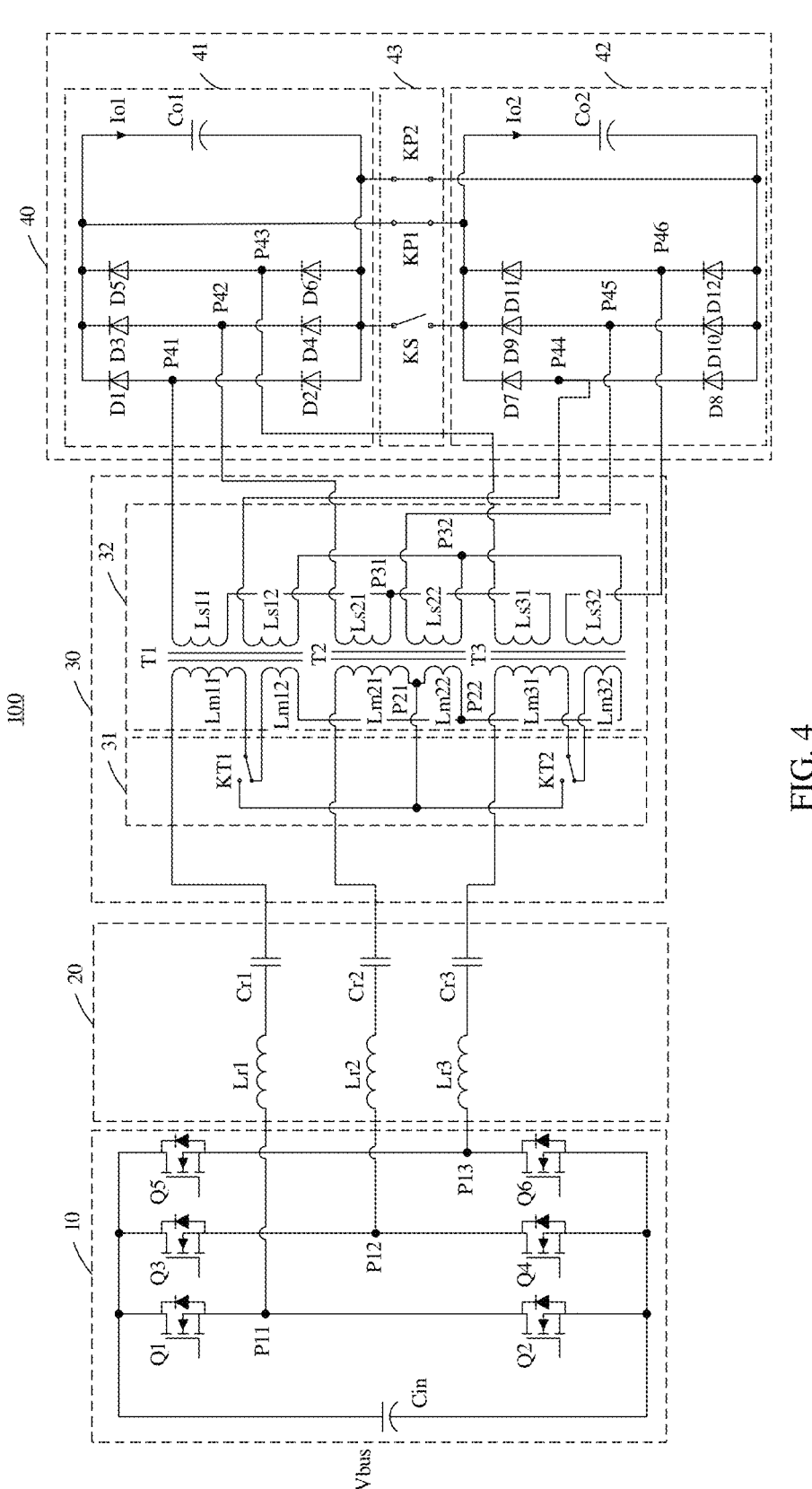
FIG. 4 is another schematic running diagram of a power supply apparatus according to an embodiment.

FIG. 4 is a schematic running diagram of the power supply apparatus 100 according to an embodiment. As shown in FIG. 4, the power supply apparatus 100 runs in the first working mode in response to that a voltage required by a load connected to the two three-phase rectifier bridge circuits falls within the first voltage range. In the first working mode, the three-phase transformer 32 runs in the second turns ratio mode through switching by the turns ratio switching circuit 31, and the two three-phase rectifier bridge circuits are connected in parallel through switching by the connection relationship switching circuit 43.

In the first working mode, the three-phase inverter bridge circuit 10 converts the input direct current bus voltage Vbus into the three-phase alternating current. The three-phase transformer 32 transmits the three-phase alternating current through the three-phase resonant circuit 20. The three-phase transformer 32 couples electric energy from a primary side of the transformer to a secondary side based on a turns ratio of the primary winding and the secondary winding of the transformer in the second turns ratio mode. The three-phase rectifier bridge circuit 41 and the three-phase rectifier bridge circuit 42 are respectively connected to the first secondary winding and the second secondary winding on the secondary side of the transformer, to convert the three-phase alternating current into a direct current. The two three-phase rectifier bridge circuits are connected in parallel, and respectively output a first output voltage Vo1 and a second output voltage Vo2. In addition, ranges of the first output voltage Vo1 and the second output voltage Vo2 are both 200 V to 320 V. When the two three-phase rectifier bridge circuits are connected in parallel, the output voltage of the power supply apparatus 100 is equal to a parallel voltage of the output voltages of the two three-phase rectifier bridge circuits. Therefore, a total output voltage Vout of the power supply apparatus 100 is equal to the first output voltage Vo1 and equal to the second output voltage Vo2, and a range of the total output voltage Vout is 200 V to 320 V. In other words, the output voltage of the power supply apparatus 100 falls within the first voltage range required by the load.

Figure 5:
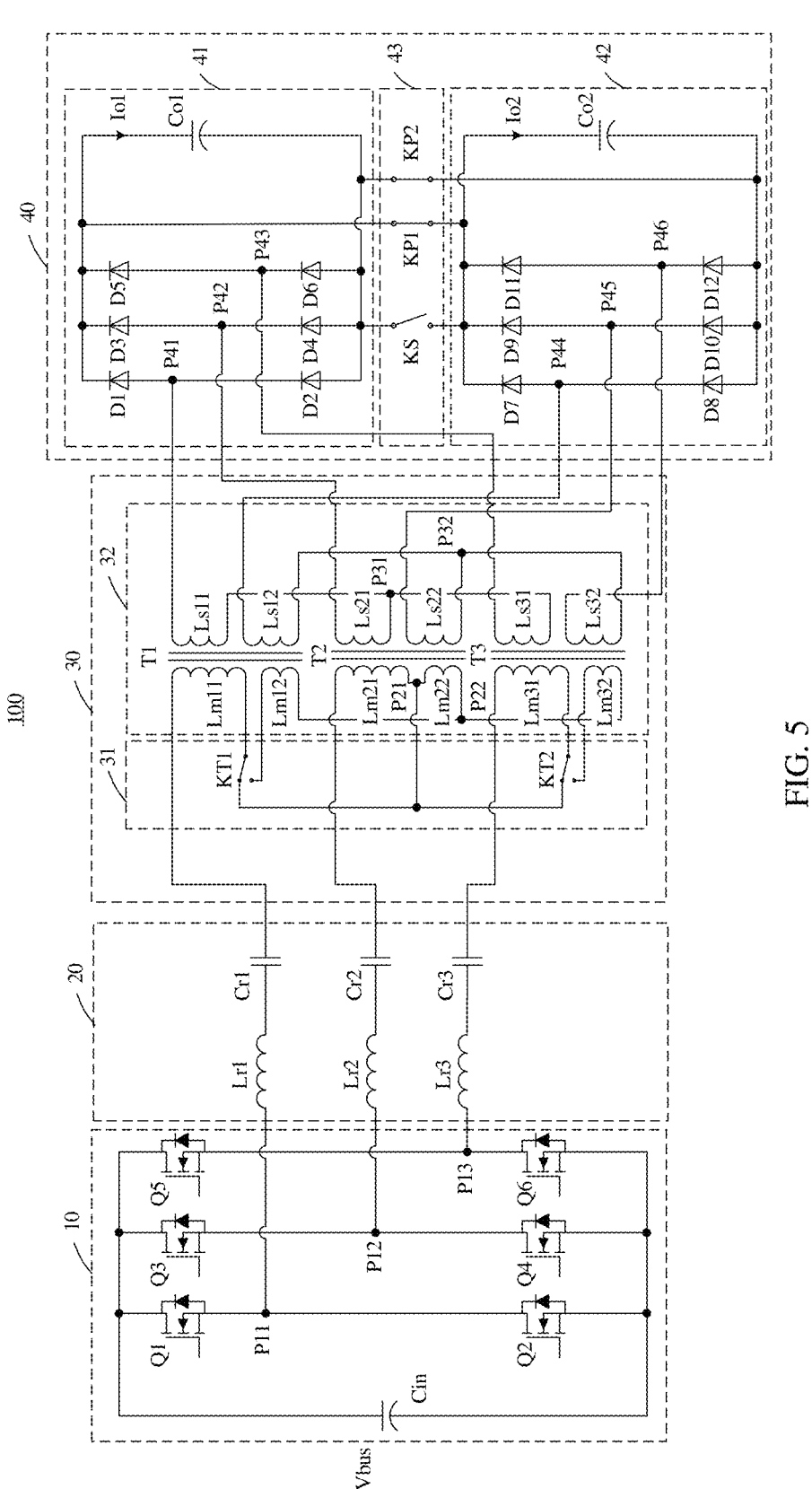
FIG. 5 is another schematic running diagram of a power supply apparatus according to an embodiment.

FIG. 5 is another schematic running diagram of the power supply apparatus 100 according to an embodiment. As shown in FIG. 5, the power supply apparatus 100 runs in the second working mode in response to that a voltage required by a load connected to the two three-phase rectifier bridge circuits falls within the second voltage range. In the second working mode, the three-phase transformer 32 runs in the first turns ratio mode through switching by the turns ratio switching circuit 31, and the two three-phase rectifier bridge circuits are connected in parallel through switching by the connection relationship switching circuit 43.

In the third working mode, the three-phase inverter bridge circuit 10 converts the input direct current bus voltage Vbus into the three-phase alternating current. The three-phase transformer 32 transmits the three-phase alternating current through the three-phase resonant circuit 20. The three-phase transformer 32 couples electric energy from a primary side of the transformer to a secondary side based on a turns ratio of the primary winding and the secondary winding of the transformer in the first turns ratio mode. The three-phase rectifier bridge circuit 41 and the three-phase rectifier bridge circuit 42 are respectively connected to the first secondary winding and the second secondary winding on the secondary side of the transformer, to convert the three-phase alternating current into a direct current. The two three-phase rectifier bridge circuits are connected in parallel, and respectively output a first output voltage Vo1 and a second output voltage Vo2. In addition, ranges of the first output voltage Vo1 and the second output voltage Vo2 are both 320 V to 500 V. When the two three-phase rectifier bridge circuits are connected in parallel, the output voltage of the power supply apparatus 100 is equal to a parallel voltage of the output voltages of the two three-phase rectifier bridge circuits. Therefore, a total output voltage Vout of the power supply apparatus 100 is equal to the first output voltage Vo1 and equal to the second output voltage Vo2, and a range of the total output voltage Vout is 320 V to 500 V. In other words, the output voltage of the power supply apparatus 100 falls within the second voltage range required by the load.

Figure 6:
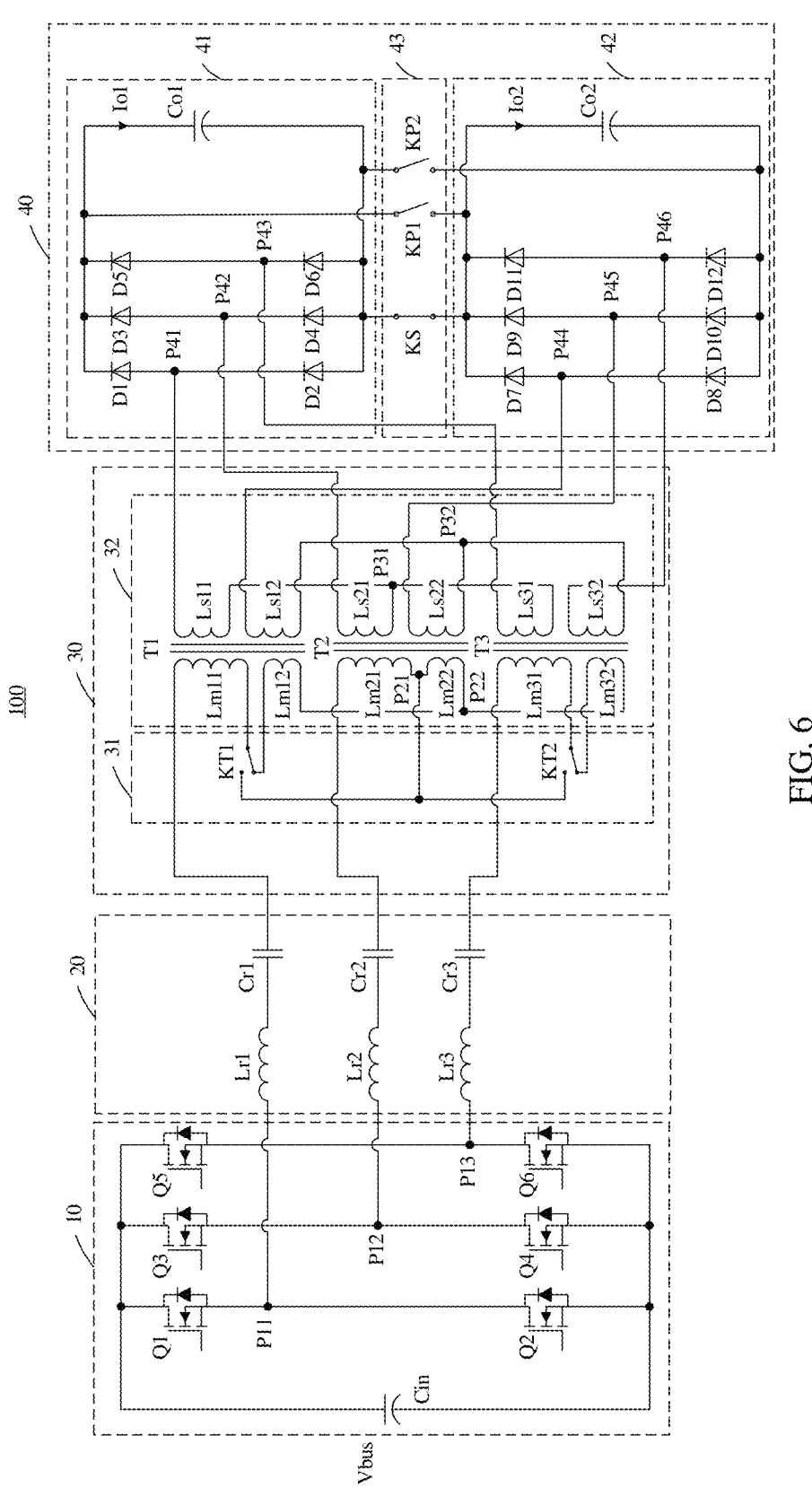
FIG. 6 is another schematic running diagram of a power supply apparatus according to an embodiment.

FIG. 6 is another schematic running diagram of the power supply apparatus 100 according to an embodiment. As shown in FIG. 6, the power supply apparatus 100 runs in the third working mode in response to that a voltage required by a load connected to the two three-phase rectifier bridge circuits falls within the third voltage range. In the third working mode, the three-phase transformer 32 runs in the second turns ratio mode through switching by the turns ratio switching circuit 31, and the two three-phase rectifier bridge circuits are connected in series through switching by the connection relationship switching circuit 43.

In the third working mode, the three-phase inverter bridge circuit 10 converts the input direct current bus voltage Vbus into the three-phase alternating current. The three-phase transformer 32 transmits the three-phase alternating current through the three-phase resonant circuit 20. The three-phase transformer 32 couples electric energy from a primary side of the transformer to a secondary side based on a turns ratio of the primary winding and the secondary winding of the transformer in the second turns ratio mode. The three-phase rectifier bridge circuit 41 and the three-phase rectifier bridge circuit 42 are respectively connected to the first secondary winding and the second secondary winding on the secondary side of the transformer, to convert the three-phase alternating current into a direct current. The two three-phase rectifier bridge circuits are connected in series, and respectively output a first output voltage Vo1 and a second output voltage Vo2. In addition, ranges of the first output voltage Vo1 and the second output voltage Vo2 are both 250 V to 320 V. When the two three-phase rectifier bridge circuits are connected in series, the output voltage of the power supply apparatus 100 is equal to a series voltage of the output voltages of the two three-phase rectifier bridge circuits. Therefore, a total output voltage Vout of the power supply apparatus 100 is equal to a sum of the first output voltage Vo1 and the second output voltage Vo2, and a range of the total output voltage Vout is 500 V to 640 V. In other words, the output voltage of the power supply apparatus 100 falls within the third voltage range required by the load.

Figure 7:
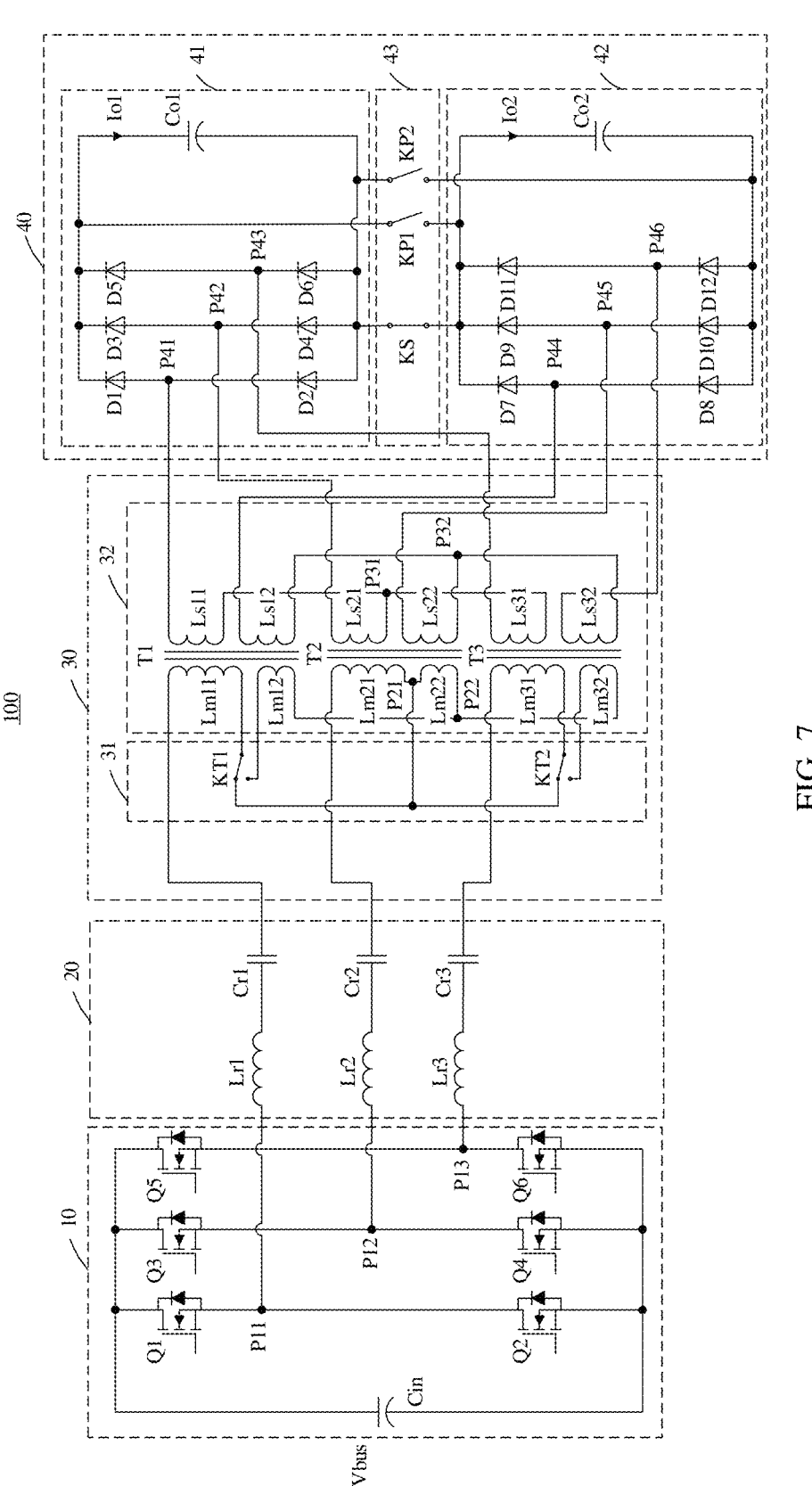
FIG. 7 is another schematic running diagram of a power supply apparatus according to an embodiment.

FIG. 7 is another schematic running diagram of the power supply apparatus 100 according to an embodiment. As shown in FIG. 7, the power supply apparatus 100 runs in the fourth working mode in response to that a voltage required by a load connected to the two three-phase rectifier bridge circuits falls within the fourth voltage range. In the fourth working mode, the three-phase transformer 32 runs in the first turns ratio mode through switching by the turns ratio switching circuit 31, and the two three-phase rectifier bridge circuits are connected in series through switching by the connection relationship switching circuit 43.

In the first working mode, the three-phase inverter bridge circuit 10 converts the input direct current bus voltage Vbus into the three-phase alternating current. The three-phase transformer 32 transmits the three-phase alternating current through the three-phase resonant circuit 20. The three-phase transformer 32 couples electric energy from a primary side of the transformer to a secondary side based on a turns ratio of the primary winding and the secondary winding of the transformer in the first turns ratio mode. The three-phase rectifier bridge circuit 41 and the three-phase rectifier bridge circuit 42 are respectively connected to the first secondary winding and the second secondary winding on the secondary side of the transformer, to convert the three-phase alternating current into a direct current. The two three-phase rectifier bridge circuits are connected in series, and respectively output a first output voltage Vo1 and a second output voltage Vo2. In addition, ranges of the first output voltage Vo1 and the second output voltage Vo2 are both 320 V to 500 V. When the two three-phase rectifier bridge circuits are connected in series, the output voltage of the power supply apparatus 100 is equal to a series voltage of the output voltages of the two three-phase rectifier bridge circuits. Therefore, a total output voltage Vout of the power supply apparatus 100 is equal to a sum of the first output voltage Vo1 and the second output voltage Vo2, and a range of the total output voltage Vout is 640 V to 1000 V. In other words, the output voltage of the power supply apparatus 100 falls within the fourth voltage range required by the load.

It may be understood that the power supply apparatus 100 in this embodiment needs only one three-phase LLC topology, with fewer devices, such as a switching transistor, a resonant inductor, a resonant capacitor, and a transformer. Therefore, the power supply apparatus 100 has a smaller size and a higher power density. In addition, due to a small quantity of devices, the power supply apparatus 100 further features higher reliability, easier assembly, a simpler control circuit, and the like.

It may further be understood that the output voltage of the power supply apparatus 100 provided in embodiments can be adjusted to be within four different voltage ranges by changing the running mode of the three-phase transformer 32 and the connection manner of the two three-phase rectifier bridge circuits. The four voltage ranges are combined to form a wide range of output voltages, so that the power supply apparatus 100 can provide power supply voltages required by various types of loads. The charging pile in which the power supply apparatus 100 can be used can provide power supply voltages required by various types of electric vehicles.

The foregoing descriptions are merely specific implementations of embodiments, but the scope of the embodiments is not limited thereto. Any variation or replacement readily figured out by a person skilled in the art within the scope of the embodiments shall fall within their scope.

What is claimed is:

1. A power supply apparatus, comprising:
   a turns ratio switching circuit, a connection relationship switching circuit, a three-phase transformer, and two three-phase rectifier bridge circuits;
   a three-phase primary winding of the three-phase transformer is configured to receive a three-phase alternating current, a three-phase secondary winding of the three-phase transformer is configured to output a three-phase alternating current to each of the two three-phase rectifier bridge circuits, and a running mode of the three-phase transformer comprises a first turns ratio mode and a second turns ratio mode;

the turns ratio switching circuit is configured to switch a quantity of turns of the three-phase primary winding, to switch the running mode of the three-phase transformer, a quantity of turns of a primary winding of each phase comprises a first quantity of turns and a second quantity of turns, the second quantity of turns is greater than the first quantity of turns, the first quantity of turns corresponds to the first turns ratio mode, and the second quantity of turns corresponds to the second turns ratio mode; and the connection relationship switching circuit is configured to switch a connection relationship between the two three-phase rectifier bridge circuits, and the two three-phase rectifier bridge circuits are connected in series or in parallel through the connection relationship switching circuit, wherein the turns ratio switching circuit or the connection relationship switching circuit is configured to adjust an output voltage range of the power supply apparatus;

in response to the turns ratio switching circuit being configured to switch the running mode of the three-phase transformer and the connection relationship switching circuit being configured to switch the connection relationship between the two three-phase rectifier bridge circuits, an output voltage of the power supply apparatus falls within at least one of a first voltage range, a second voltage range, a third voltage range, or a fourth voltage range; and an upper limit of the first voltage range is less than or equal to a lower limit of the second voltage range, and an upper limit of the third voltage range is less than or equal to a lower limit of the fourth voltage range, and wherein the power supply apparatus comprises a three-phase inverter bridge circuit, three bridge arm midpoints of the three-phase inverter bridge circuit output a three-phase alternating current to three primary windings of the three-phase transformer through a three-phase resonant circuit, and the three-phase inverter bridge circuit is configured to:

run in a first switching frequency range in response to that a parallel voltage of the two three-phase rectifier bridge circuits falls within the second voltage range, that a series voltage of the two three-phase rectifier bridge circuits falls within the third voltage range or the fourth voltage range, that the connection relationship switching circuit connects the two three-phase rectifier bridge circuits in series, or that the connection relationship switching circuit connects the two three-phase rectifier bridge circuits in parallel and the three-phase transformer runs in the first turns ratio mode, wherein an upper limit of the first switching frequency range is less than or equal to resonant frequencies of the three-phase transformer and the three-phase resonant circuit; and run, based on a result of comparing the parallel voltage of the two three-phase rectifier bridge circuits with a voltage threshold, at the first switching frequency range or in a second switching frequency range in response to that the parallel voltage of the two three-phase rectifier bridge circuits falls within the first voltage range, or that the connection relationship switching circuit connects the two three-phase rectifier bridge circuits in parallel and the three-phase transformer runs in the second turns ratio mode, wherein a lower limit of the second switching frequency range is greater than the resonant frequency of the three-phase resonant circuit, and the another voltage threshold is greater than a lower limit of the first voltage range and less than the upper limit of the first voltage range.

2. The power supply apparatus according to claim 1, wherein the primary winding of each phase of the three-phase transformer comprises a first primary winding and a second primary winding, one end of each of the three first primary windings is configured to receive a three-phase alternating current through a three-phase resonant circuit, and the other ends of the three second primary windings are connected; in a primary winding of one phase, the other end of the first primary winding is connected to one end of the second primary winding to form a tap; and the turns ratio switching circuit comprises two turns ratio switching switches; and the two turns ratio switching switches each are configured to connect the other end of the first primary winding to one end of the second primary winding in each of primary windings of the other two phases, or connect the other end of each of the two first primary windings in primary windings of the other two phases to the tap.

3. The power supply apparatus according to claim 1, wherein the primary winding of each phase of the three-phase transformer comprises a first primary winding and a second primary winding, one end of each of the three first primary windings is configured to receive a three-phase alternating current through a three-phase resonant circuit; in the primary winding of each phase, and the other end of the first primary winding is connected to one end of the second primary winding to form a tap; and the turns ratio switching circuit comprises three turns ratio switching switches; and the three turns ratio switching switches are configured to sequentially connect the three first primary windings in the three-phase primary winding through the three taps, or sequentially connect the primary windings of three phases through the other ends of the three second primary windings.

4. The power supply apparatus according to claim 1, wherein a secondary winding of each phase of the three-phase transformer comprises a first secondary winding and a second secondary winding;

one end of each of the three first secondary windings in the three-phase transformer is connected to one of three bridge arm midpoints of one of the three-phase rectifier bridge circuits, and the other ends of the three first secondary windings are connected; and one end of each of the three second secondary windings in the three-phase transformer is connected to one of three bridge arm midpoints of the other three-phase rectifier bridge circuit, and the other ends of the three second secondary windings are connected.

5. The power supply apparatus according to claim 1, wherein a secondary winding of each phase of the three-phase transformer comprises a first secondary winding and a second secondary winding;

the three first secondary windings are sequentially connected, and one end of each of the three first secondary windings is configured to be connected to one of three bridge arm midpoints of one of the three-phase rectifier bridge circuits; and the three second secondary windings are sequentially connected, and one end of each of the three second secondary windings is configured to be connected to one of three bridge arm midpoints of the other three-phase rectifier bridge circuit.

6. The power supply apparatus according to claim 1, wherein the connection relationship switching circuit comprises a series switch and two parallel switches;

the series switch is configured to connect the two three-phase rectifier bridge circuits in series, and two ends of the series switch are respectively connected to a positive electrode of one of the three-phase rectifier bridge circuits and a negative electrode of the other three-phase rectifier bridge circuit; and the two parallel switches are configured to connect the two three-phase rectifier bridge circuits in parallel, two ends of one of the parallel switches are respectively connected to negative electrodes of the two three-phase rectifier bridge circuits, and two ends of the other parallel switch are respectively connected to positive electrodes of the two three-phase rectifier bridge circuits.

7. The power supply apparatus according to claim 1, wherein the turns ratio switching circuit is configured to:

in response to connecting the two three-phase rectifier bridge circuits in parallel by the connection relationship switching circuit, switch the running mode of the three-phase transformer so that the power supply apparatus outputs a voltage within the first voltage range or the second voltage range; and in response to connecting the two three-phase rectifier bridge circuits in series by the connection relationship switching circuit, switch the running mode of the three-phase transformer so that the power supply apparatus outputs a voltage within the third voltage range or the fourth voltage range.

8. The power supply apparatus according to claim 1, wherein the turns ratio switching circuit is configured to:

switch the running mode of the three-phase transformer in response to a result of comparing a series voltage or a parallel voltage of the two three-phase rectifier bridge circuits with at least one preset voltage; wherein the at least one preset voltage comprises an upper limit or a lower limit of at least one of the first voltage range, the second voltage range, the third voltage range, or the fourth voltage range.

9. The power supply apparatus according to claim 1, wherein the connection relationship switching circuit is configured to:

in response to running in the first turns ratio mode by the three-phase transformer, switch the connection relationship between the two three-phase rectifier bridge circuits so that the power supply apparatus outputs a voltage within the second voltage range or the fourth voltage range; and in response to running in the second turns ratio mode by the three-phase transformer, switch the connection relationship between the two three-phase rectifier bridge circuits so that the power supply apparatus outputs a voltage within the first voltage range or the third voltage range.

10. The power supply apparatus according to claim 1, wherein the connection relationship switching circuit is configured to:

switch the connection relationship between the two three-phase rectifier bridge circuits in response to a result of comparing a series voltage or a parallel voltage of the two three-phase rectifier bridge circuits with at least one preset voltage; wherein the at least one preset voltage comprises an upper limit or a lower limit of at least one of the first voltage range, the second voltage range, the third voltage range, or the fourth voltage range.

11. A charging pile, comprising the power supply apparatus according to claim 1.

12. The power supply apparatus according to claim 1, wherein the power supply apparatus is configured to operate in four working modes respectively corresponding to the first voltage range, the second voltage range, the third voltage range, and the fourth voltage range;

in a first working mode, the three-phase transformer runs in the second turns ratio mode and the two three-phase rectifier bridge circuits are connected in parallel so that the output voltage falls within the first voltage range;

in a second working mode, the three-phase transformer runs in the first turns ratio mode and the two three-phase rectifier bridge circuits are connected in parallel so that the output voltage falls within the second voltage range;

in a third working mode, the three-phase transformer runs in the second turns ratio mode and the two three-phase rectifier bridge circuits are connected in series so that the output voltage falls within the third voltage range; and in a fourth working mode, the three-phase transformer runs in the first turns ratio mode and the two three-phase rectifier bridge circuits are connected in series so that the output voltage falls within the fourth voltage range.

13. The power supply apparatus according to claim 12, wherein, in the fourth working mode, the two three-phase rectifier bridge circuits are connected in series to output a first output voltage and a second output voltage each in a range from 320 V to 500 V, and a total output voltage equal to a sum of the first output voltage and the second output voltage is in a range from 640 V to 1000 V.

14. The power supply apparatus according to claim 12, further comprising a control circuit configured to select one of the four working modes in response to a voltage required by a load connected to the two three-phase rectifier bridge circuits, such that the output voltage falls within a corresponding one of the first voltage range, the second voltage range, the third voltage range, and the fourth voltage range.

\* \* \* \* \*